United States Patent [19]

Black et al.

[11] Patent Number: 5,802,220
[45] Date of Patent: Sep. 1, 1998

[54] APPARATUS AND METHOD FOR TRACKING FACIAL MOTION THROUGH A SEQUENCE OF IMAGES

[75] Inventors: Michael J. Black, Menlo Park, Calif.; Yaser Yacoob, College Park, Md.

[73] Assignee: Xerox Corporation, Stamford, Conn.

[21] Appl. No.: 574,176

[22] Filed: Dec. 15, 1995

[51] Int. Cl.⁶ .................................................. G06F 9/36
[52] U.S. Cl. ........................ 382/276; 382/100; 382/293
[58] Field of Search ............................... 382/276, 293, 382/294, 118, 215, 100, 236

[56] References Cited

U.S. PATENT DOCUMENTS

| | | | |
|---|---|---|---|
| 4,975,960 | 12/1990 | Petajan | 382/100 |
| 5,067,014 | 11/1991 | Bergen et al. | 358/105 |
| 5,259,040 | 11/1993 | Hanna | 382/276 |
| 5,557,684 | 9/1996 | Wang et al. | 382/236 |
| 5,581,276 | 12/1996 | Cipolla et al. | 395/135 |

OTHER PUBLICATIONS

Bergen, James R. and Peter J. Burt. "A Three-Frame Algorithm for Estimating Two-Component Image Motion," IEEE Transactions on Pattern Analysis and Machine Intelligence, vol. 14, No. 9, pp. 886–896, Sep. 1992.

Black, M.J., Yacoob, Y., "Recognizing Facial Expressions under Rigid and Non-Rigid Facial Motions," published at International Workshop on Face & Gesture Recognition, Zurich, Jun. 1995.

Black, M.J., Yacoob, Y., "Tracking and Recognizing Facial Expressions in Image Sequences, using Local Parameterized Models of Image Motion," published at Center for Automation Research, University of Maryland, Jan. 1995.

Chow et al., "Towards a System for Automatic Facial Feature Detection," Pattern Recognition, 26(12): 1739–1755, 1993.

Yacoob et al., "Labeling of Human Face Components From Range Data," Proc. Computer Vision and Pattern Recognition, CVPR-94, pp. 592–593, New York, NY, Jun. 1993.

Koenderink et al., "Invariant Properties of the Motion Parallax Field Due to the Movement of Rigid Bodies Relative to An Observer," Optica Acta, 22(9):773–791, 1975.

(List continued on next page.)

Primary Examiner—Yon J. Couso

[57] ABSTRACT

A system tracks human head and facial features over time by analyzing a sequence of images. The system provides descriptions of motion of both head and facial features between two image frames. These descriptions of motion are further analyzed by the system to recognize facial movement and expression. The system analyzes motion between two images using parameterized models of image motion. Initially, a first image in a sequence of images is segmented into a face region and a plurality of facial feature regions. A planar model is used to recover motion parameters that estimate motion between the segmented face region in the first image and a second image in the sequence of images. The second image is warped or shifted back towards the first image using the estimated motion parameters of the planar model, in order to model the facial features relative to the first image. An affine model and an affine model with curvature are used to recover motion parameters that estimate the image motion between the segmented facial feature regions and the warped second image. The recovered motion parameters of the facial feature regions represent the relative motions of the facial features between the first image and the warped image. The face region in the second image is tracked using the recovered motion parameters of the face region. The facial feature regions in the second image are tracked using both the recovered motion parameters for the face region and the motion parameters for the facial feature regions. The parameters describing the motion of the face and facial features are filtered to derive mid-level predicates that define facial gestures occurring between the two images. These mid-level predicates are evaluated over time to determine facial expression and gestures occurring in the image sequence.

26 Claims, 18 Drawing Sheets

OTHER PUBLICATIONS

Toelg et al., "Towards an Example–Based Image Compression Architecture for Video–Conferencing," MIT Artificial Intelligence Laboratory and Center For Biological And Computational Learning Department Of Brain And Cognitive Sciences, A.I. Memo No1 1494 & C.B.C.L. Memo No. 100, Jun. 1994.

Rousseeuw, P.J., Leroy, Annick M., "Introduction," Robust Regression and Outlier Detection, John Wiley & Sons, pp. 1–18.

Bergen et al., "Multiple Component Image Motion: Motion Estimation", David Sarnoff Research Center, Princeton, NJ, Jan. 1990, pp. 1–24.

D. Tock and I. Craw, "Tracking and Measuring Drivers Eyes". Christopher M. Brown and Demetri Terzopoulos, editors, Real–time Computer Vision. Publications of the Newton Institute, pp. 71–89.

McLachlan, G.J., Basford, K.E., "Mixture Likelihood Approach to Clustering," Mixture Models Inference and Applications to Clustering, Marcel Dekker, Inc., New York, pp. 9–21.

Shapiro, L.S., Brady, M. and Zisserman, A., "Tracking Moving Heads," Real–time Computer Vision. Publications of the Newton Institute, pp. 35–69.

Koch, R., "Dynamic 3–D Scene Analysis through Synthesis Feedback Control," IEEE Transactions on Pattern Analysis and machine Intelligence, vol. 15, No. 6, Jun. 1993, pp. 556–568.

Yuille, A., Hallinan, P., "Deformable Templates," Active Vision, Andrew Blake and Alan Yuille, editors; pp. 21–38.

Azarbayejani et al., "Visually controlled graphics," IEEE Transactions on Pattern Analysis and Machine Intelligence, 15(6):602–604, Jun. 1993.

Kass et al., "Snakes: Active Counter Modes," First International Conference on Computer Vision, pp. 259–268, Jun. 1987.

Essa et al., "Tracking Facial Motion," Proceedings of the Workshop on Motion of Non–rigid and Articulated Objects, pp. 36–42, Austin Texas, Nov. 1994.

Li et al., "3–D Motion Estimation in Model–based Facial Image Coding," IEEE Transactions on Pattern Analysis and Machine Intelligence, 14(6):545–555, Jun. 1993.

Rosenblum et al., "Human Emotion Recognition From Motion Using A Radial Basis Function Network Architecture," Proceedings of the Workshop on Motion of Non–rigid and Articulated Objects, Austin Texas, Nov. 1994.

Yacoob et al., "Computing Spatio–Temporal Representations of human faces," Proc. Computer Vision and Pattern Recognition, CVPR–94, pp. 70–75, Seattle WA, Jun. 1994.

Essa et al., A Vision System for Observing and Extracting Facial Action Parameters, Proc. Computer Vision and Pattern Recognition, CVPR–94, pp. 76–83, Seattle WA, Jun. 1994.

Terzopoulos et al., "Analysis and Synthesis of Facial Images Sequences Using Physical and Anatomical Models," IEEE Transactions on Pattern Analysis and Machine Intelligence, 15(6):569–579, Jun. 1993.

Bergen et al., "Hierarchical Model–Based Motion Estimation," Proc. of Second European Conference on Computer Vision, ECCV–92, vol. 588 of LNCS–Series, pp. 237–252, Springer–Verlag, May 1992.

Black et al., "The Robust Estimation of Multiple Motions: Affine and piecewise–smooth flow fields," Technical Report P93–00104, Xerox PARC, Dec. 1993.

Black et al., "A Framework for The Robust Estimation of Optical Flow," Proc. int. Conf. on Computer Vision, ICCV–93, pp. 231–236, Berlin, Germany, May 1993.

Yuille et al., "Feature Extraction From Faces Using Deformable Templates," Proc. Computer Vision and Pattern Rcognition, CVPR–89, pp. 104–109, Jun. 1989.

Ekman, "Facial Expressions Of Emotion: An Old Controversy and New Findings," Philosophical Transactions of the Royal Society of London, B(335):63–69, 1992.

Bassilli, "Emotion Recognition: The Role of Facial Movement and the Relative Importance of Upper and Lower areas of the Face," Journal of Personal and Social Psychology, 37:2049–2059, 1979.

Burt, P.J., "Multiresolution Techniques for Image Representation, Analysis, and 'Smart' Transmission," SPIE Conf. 1199, Visual Communications and Image Processing IV, Philadelphia, Nov. 1989.

Burt, P.J., "Attention Mechanisms for Vision in a Dynamic World," IEEE, 1988.

Hampel et al. "Robust Statistics: The Approach Based on Influence Functions," John Wiley and Sons, New York, NY, 1986.

$I_1(t)$ $I_2(t+1)$ $I_1(t)$ $I_1^{rot}(t)$ $I_2^{rot}(t+1)$ $I_1^{rot}(t)$  $I_2^{rot}(t+1)$ $I_1^{rot}(t)$  $I_2^{rot}(t+1)$ $I_2^{rot}(t+1)$ $I_2^{rot}(t+1)$  $I_3^{warp}(t)$ $I_1^{rot}(t)$ $I_2^{rot}(t+1)$ $I_2(t+1)$

APPARATUS AND METHOD FOR TRACKING FACIAL MOTION THROUGH A SEQUENCE OF IMAGES

Cross reference is made to the co-pending U.S. patent application Ser. No. 08/572,776, filed concurrently herewith, and entitled "Apparatus And Method For Recognizing Facial Expressions And Facial Gestures In A Sequenced Of Images" now pending.

The present invention relates generally to computer vision, and more particularly to a method and apparatus for tracking facial motion through sequences of images while recognizing facial gestures and expression.

BACKGROUND OF THE INVENTION

Besides speech, humans communicate using many forms of non-verbal communication. Some forms of non-verbal communication are expressions created by muscular deformations of facial features. Other forms of non-verbal communication are time-varying head motion that are used to elicit many expressive head gestures. Isolating each form of communication in a sequence of images provides a richer understanding of accompanying speech.

Computer vision systems have been able to interpret non-verbal communication from a sequence of images by isolating either gestures or facial expression. Specifically, computer vision systems that recover non-verbal communications such as gestures tend to be systems that track rigid head motion without evaluating facial expressions. Alternatively, computer vision systems that recover non-verbal communication such as facial expression tend to be systems that recognize facial expression on a stationary head without gesture movement. Few systems, however, are capable of simultaneously recognizing gestures and facial expression in a sequence of images. In other words, few systems are capable of both tracking rigid head motion while recognizing non-rigid or deformable motion of facial features over a sequence of images.

A. Tracking Rigid Head Motion

Tracking rigid head motion without evaluating facial expressions is disclosed by Azarbayejani et al. in "Visually controlled graphics," IEEE Transactions on Pattern Analysis and Machine Intelligence, 15(6):602–604, June 1993. Specifically, Azarbayejani et al. discloses an approach for rigid head tracking and motion estimation by tracking points with high texture. This approach tracks several points with high texture over the head and recovers three dimensional motion parameters of the head by solving an over-constrained set of motion equations.

B. Modeling Facial Features

While head tracking involves tracking the motion of a rigid object performing rotations and translations, human facial feature tracking involves tracking diverse non-rigid deformations that are limited by the anatomy of the head. Feature boundary tracking and feature region tracking are two basic types of feature tracking. Feature boundary tracking attempts to track and accurately delineate the shapes of facial features. For example, tracking the contours of the lips and the opening of the mouth is disclosed by Kass et al. in "Snakes: Active Contour Modes," First International Conference on Computer Vision, pages 259–268, June 1987. On the other hand, feature region tracking addresses the problem of tracking a region surrounding a feature of the face, such as a bounding box. Feature region tracking pays little if any attention to the detailed shape of a feature. Generally, facial features are subject to a plurality of motions that include rigid motion, articulated motion, and deformable motion: rigid motion is due to a head's translation or rotation; articulated motion includes motion of the lower jaw during speech and several facial expressions such as surprise; and typical deformable motions are due to muscle contractions and expansions that accompany speech and facial expressions.

Essa et al. discloses in "Tracking Facial Motion," Proceedings of the Workshop on Motion Of Non-rigid and Articulated Objects, pages 36–42, Austin Tex., November 1994, a three dimensional model-based approach for tracking facial features. This approach places a mesh on the face and uses an optical flow field to displace the mesh vertices and recover the location of points on the face during facial deformation. Rigid head motion was not allowed by this approach since there was no way to factor the optical flow into separate head and feature motions.

Li et al. discloses in "3-D Motion Estimation in Model-based Facial Image Coding," IEEE Transactions on Pattern Analysis and Machine Intelligence, 14(6):545–555, June 1993, a model-based approach that assumes that a three-dimensional mesh has been placed on the face in an image, and that the depths of points on the face have been recovered. Li et al. proposes algorithms for recovering the rigid and non-rigid motions of the face from the sequences of images, and reapplying these motions to create an approximation to the initial sequence. This model-based approach employs knowledge about the anatomy of the face to constrain the estimation of the non-rigid facial motion.

Facial feature tracking based on analysis of the magnitudes of gradients of an intensity image and the optical flow fields of an image sequence is disclosed by Rosenblum et al. in "Human Emotion Recognition From Motion Using A Radial Basis Function Network Architecture," Proceedings of the Workshop on Motion of Non-rigid and Articulated Objects," Austin Tex., November 1994, and by Yacoob et al. in "Computing spatio-temporal representations of human faces," Proc. Computer Vision and Pattern Recognition, CVPR-94, pages 70–75, Seattle Wash. June 1994. The changes in gradient values between consecutive images provided clues to the spatial change of each facial feature. This approach performs well with articulated and deformable motions, but was unable to accommodate rigid head motion.

C. Modeling Facial Expression

A number of different approaches have been used to model facial expressions. The different models contain varying amounts of geometric information that relate to head shape and head motion.

One approach of modeling facial expressions employs physically-based models of heads including skin and musculature as disclosed by Essa et al. in "A Vision System for Observing and Extracting Facial Action Parameters, Proc. Computer Vision and Pattern Recognition, CVPR-94, pages 76–83, Seattle Wash., June 1994. Here, Essa et al. discloses a template-based strategy for recognizing facial expressions. Such an approach lacks explicit information about the motion of the features and may prove hard to generalize to situations with significant head motion. Using this approach requires multiple templates to recognize the same expression under different viewing positions, since head motion causes the appearance of features to change.

Expression recognition with a roughly stationary head and changing expression is disclosed by Terzopoulos et al. in "Analysis and Synthesis of Facial Image Sequences Using Physical and Anatomical Models," IEEE Transactions on Pattern Analysis and Machine Intelligence, 15(6):569–579, June 1993. Here, Terzopoulos et al. discloses an approach that assumes that eleven principal contours are initially located, in practice manually, on the face. These contours are tracked throughout the sequence by applying an image force field that is computed from the gradient of the intensity image. In addition to assuming a frontal view, this approach assumes that the projection is orthographic and that some facial make-up is required.

Other approaches determine facial expression by matching stored image templates to the image currently being evaluated use less explicit spatial information (for example as disclosed by Essa et al. in "Tracking Facial Motion" which is cited above). In contrast, approaches disclosed by Yacoob et al. in "Computing Spatio-Temporal Representations of Human Faces, cited above recognize facial expressions in image sequences using statistical properties of the optical flow with only very weak models of facial shape.

The middle ground between template-based approaches and optical-flow approaches to modeling facial expression or more generally image motion is a parameterized approach. Parameterized flow models have been readily used to estimate the motion of rigid scenes as disclosed by Bergen et al. in "Hierarchical Model-Based Motion Estimation," Proc. of Second European Conference on Computer Vision, ECCV92, vol. 588 of LNCS-Series, pages 237–252, Springer-Verlag, May 1992; by Black et al. "The Robust Estimation of Multiple Motions: Affine and piecewise-smooth flow fields," Technical Report P93-00104, Xerox PARC, December 1993; and by Black et al. "A Framework for The Robust Estimation of Optical Flow," Proc. mt. Conf. on Computer Vision, ICCV-93. pages 231–236, Berlin, Germany, May 1993.

A slightly weaker physically-based model uses deformable templates to represent feature shapes in an image. Expression recognition with no head motion is disclosed by Yuille et al. in "Feature Extraction From Faces Using Deformable Templates," Proc. Computer Vision and Pattern Recognition, CVPR-89, pages 104–109, June 1989.

D. Paralleling Emotion with Facial Expression

Psychology research has found that at least six emotions are universally associated with distinct facial expressions. These six principle emotions which include happiness, sadness, surprise, fear, anger, and disgust are disclosed by Ekman, in "Facial Expressions Of Emotion: An Old Controversy and New Findings," Philosophical Transactions of the Royal Society of London, B(335):63–69, 1992. As found by Young et al., in "Handbook of Research on Face Processing," Elsevier, 1989, most research on facial expressions has been conducted on "mug shot" pictures that tend to capture a subject's expression at its peak. These pictures allow one to detect the presence of static cues such as wrinkles, as well as, the positions and shapes of facial features. In experiments, Bassilli in "Emotion Recognition: The Role of Facial Movement and the Relative Importance of Upper and Lower areas of the Face," Journal of Personal and Social Psychology, 37:2049–2059, 1979, suggests that motion in an image of a face would allow the identification of expressions even with very little information about the spatial arrangement of features. Bassilli had subjects of his experiments display image sequences depicting emotion in which only white dots were visible on the dark surface of a face. Results from Bassilli's experiments indicated that facial expressions were more accurately recognized from dynamic images than from single static images. For instance, while all expressions were recognized above chance level (i.e., above 16%) in dynamic images, only happiness and sadness were recognized at above chance levels in static images.

The aforementioned systems, however, tend to be unable to simultaneously track rigid head motion while perceiving discrete facial actions and expressions. Specifically, such systems do not provide facilities for recognizing facial expressions in image sequences with significant head motion that can be later used by applications as passive or active input. For example, sequences of facial gestures or facial motion could define interaction protocols that are associated with commands to actively control any number of machines. Alternatively, sequences of facial motion or expression could be used as input by computer applications to analyze facial expressions in order to gain information covering non-verbal behavior. Accordingly, it would be desirable to provide a motion estimation system that tracks both rigid objects such as a head while tracking non-rigid facial features of the head. It is, therefore, an object of the present invention to recognize facial expressions in a sequence of images with significant head motion. It is a further object of the invention to use parameterized models of image motion to describe rigid and non-rigid facial motions locally in space and time.

SUMMARY OF THE INVENTION

In accordance with one aspect of the invention, there is provided a method for estimating movements of a face and a facial feature of a human appearing in a sequence of images recorded over time. The method includes the steps of: acquiring with a processor a first image and a second image from the sequence of images, the first image being recorded at a first instant in time and the second image being recorded at a second instant in time; locating with the processor a first region of the first image in which the face is located and a second region of the first image in which the facial feature is located; computing with the processor a first transformation to estimate a movement of the face between the first region in the first image and a first region in the second image; forming a third image using the processor by warping the second image with the first transformation, the forming step eliminating, in the third image, the movement of the face between the first region in the first image and the first region in the second image so as to isolate, in the third image, a movement of the facial feature between the second region in the first image and a second region in the second image; computing with the processor a second transformation to estimate a movement of the facial feature between the second region in the first image and a region in the third image; and combining with the processor the first transformation and the second transformation to estimate the movement of the facial feature between the second region in the first image and the second region in the second image.

In accordance with another aspect of the invention, there is provided a method for estimating movements of a first object and a second object appearing in a sequence of images recorded over time. The method includes the steps of: acquiring with a processor a first image and a second image from the sequence of images, the first image being recorded at a first instant in time and the second image being recorded at a second instant in time; locating with the processor a first region of the first image in which the first object is located and a second region of the first image in which the second object is located; computing with the processor a first transformation to estimate a movement of the first object between the first region in the first image and a first region in the second image; and computing with the processor a second transformation to estimate a movement of the second object between the second region in the first image and a second region in the second image by constraining the movement of the second object between the first image and the second image with the first transformation.

In accordance with yet another aspect of the invention, there is provided a system for estimating movements of a first object and a second object appearing in a sequence of images recorded over time. A sequence manager acquires with a processor a first image and a second image from the sequence of images, the first image being recorded at a first instant in time and the second image being recorded at a second instant in time. An image segmentation system locates with the processor a first region of the first image in which the first object is located and a second region of the first image in which the second object is located. First means compute with the processor a first transformation to estimate a movement of the first object between the first region in the first image and a first region in the second image. Means form a third image using the processor by warping the second image with the first transformation, the forming means eliminating, in the third image, the movement of the first object between the first region in the first image and the first region in the second image so as to isolate, in the third image, a movement of the second object between the second region in the first image and a second region in the second image. Second means compute with the processor a second transformation to estimate a movement of the second object between the second region in the first image and a region in the third image. Means combine with the processor the first transformation and the second transformation to estimate the movement of the second object between the second region in the first image and the second region in the second image.

BRIEF DESCRIPTION OF THE DRAWINGS

These and other aspects of the invention will become apparent from the following descriptions to illustrate a preferred embodiment of the invention read in conjunction with the accompanying drawings wherein the same reference numerals have been applied to like parts and in which.

DETAILED DESCRIPTION

A. System Overview

Figure 1:
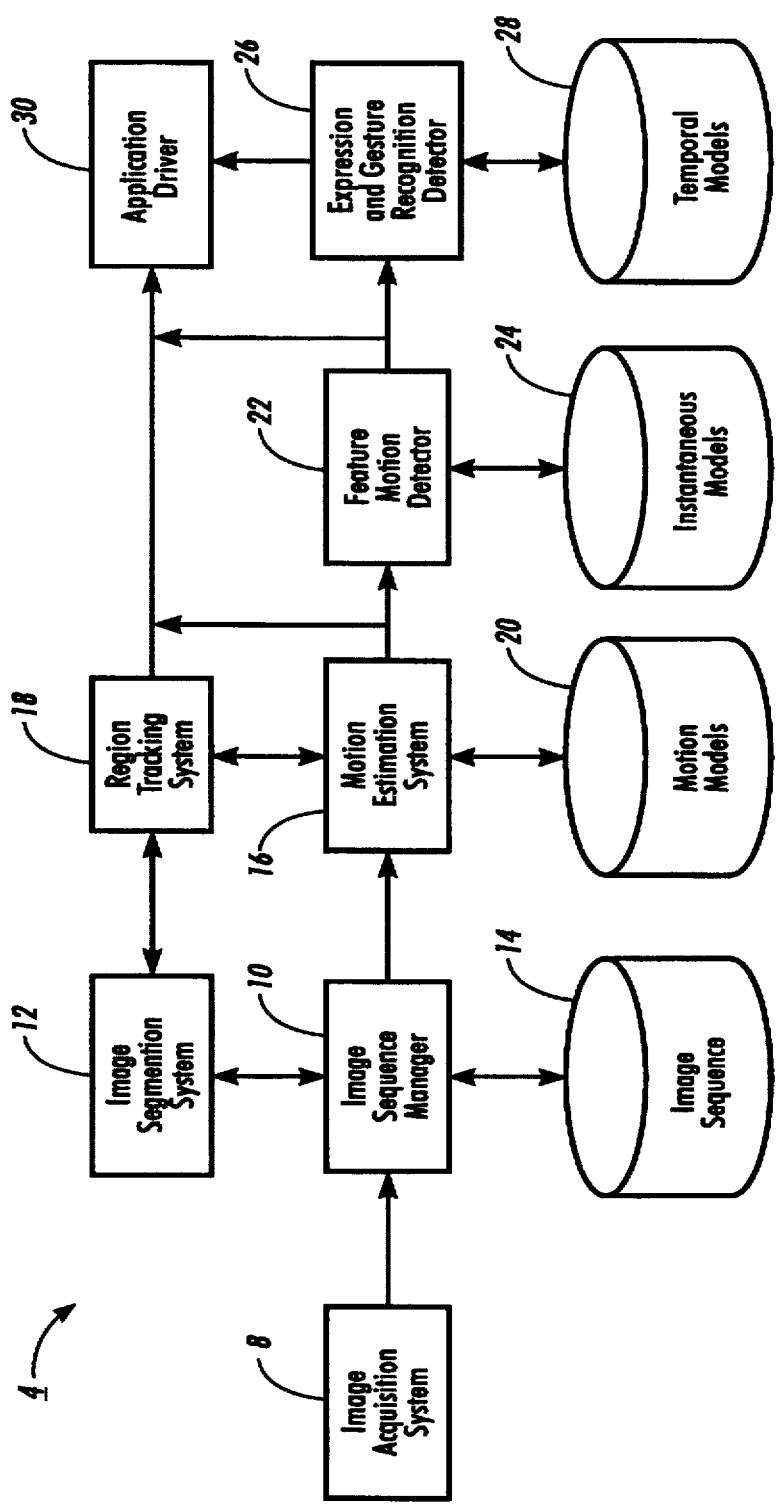
FIG. 1 is an overview of a facial expression recognition system incorporating the present invention.

Referring now to the drawings where the showings are for the purpose of describing the preferred embodiment of the invention and not for limiting same, FIG. 1 shows a general block diagram of a facial expression and gesture recognition system 4 incorporating the present invention. Generally, the system 4 includes an image acquisition system 8 which directs a sequence of images of a human face to an image sequence manager 10. The sequence manager 10 controls the system by directing the sequence of images (I(t) ... I(t+N)) to a motion estimation system 16, where at least the first image of the sequence of N images is segmented into regions by an image segmentation system 12. The sequence of N images form N−1 image pairs, each image pair in the sequence of N−1 image pairs having a leading image and a trailing image in the sequence of N images. The segmented regions include a face region, eye regions, eyebrow regions, and a mouth region. The motion estimation system 16 uses parameterized models of image motion, which are stored in memory 20, to evaluate the motion of each image segment between the two images in the sequence of images. Parameters of the models, which describe motions of the face and features between images or image pairs, are estimated using a robust regression technique. These parameters are used by a region tracking system 18 to predict the locations of the segments in a subsequent image (or frame).

Motion estimation system 16 initially determines a first set of parameters modeling the segmented face region between two images in the sequence of images. A warped image is formed by shifting one of the two images towards the other using the first set of parameters. The warped image eliminates motion of the face region between the two images in the sequence of images. Subsequently, the motion estimations system 16 determines a second set of parameters modeling the segmented eye regions, eyebrow regions, and mouth region between the warped image and the image in the sequence of images to which the warped image was shifted. The two sets of parameters are used by the motion estimation system 16 to determine the image motion of the segmented eye regions, eyebrow regions, and mouth region between the two images in the sequence of images.

In addition, the motion parameters are used by a feature motion detector 22 to estimate facial changes at each frame using instantaneous models stored in memory 24. An express ion and gesture recognition detector 26 uses temporal models stored in memory 28 to evaluate the temporal consistency of the facial changes output by the feature motion detector 22. An application driver 30 controls either passive or active applications using output from either systems 16 or 18 or detectors 22 or 26.

More specifically, the acquisition device 8, such as a camera, captures images of a user's face. The image sequence manager 10 receives an image sequence from the acquisition system 8 and stores the image sequence in memory 14. Memory 14 is defined herein as any element in which an image can be stored. Alternatively, the image acquisition system 8 may receive image sequences from a storage device (not shown), such as a hard drive or an optical disk, connected directly thereto or remotely from a network or the like (not shown).

After receiving from the image acquisition system 8 a first image and a second image from an image sequence, the image sequence manager 10 invokes image segmentation system 12 to locate the face and its features in the first image frame. Segmentation performed by the image segmentation system 12 is performed either manually or automatically. Manual segmentation is accomplished by having users position the video stream of their face over a predefined template region as displayed on a video monitor (not shown). Alternatively, automatic segmentation can be performed using systems described by: Chow et al. in "Towards a System for Automatic Facial Feature Detection," Pattern Recognition, 26(12):1739–1755, 1993; Yacoob et al. in "Labeling of Human Face Components From Range Data," Proc. Computer Vision and Pattern Recognition, CVPR-94, pages 592–593, New York, N.Y., June 1993; or Yuille et al. in "Feature Extraction from Faces using Deformable Templates, cited above (the pertinent portions of each reference are incorporated herein by reference).

Figure 2:
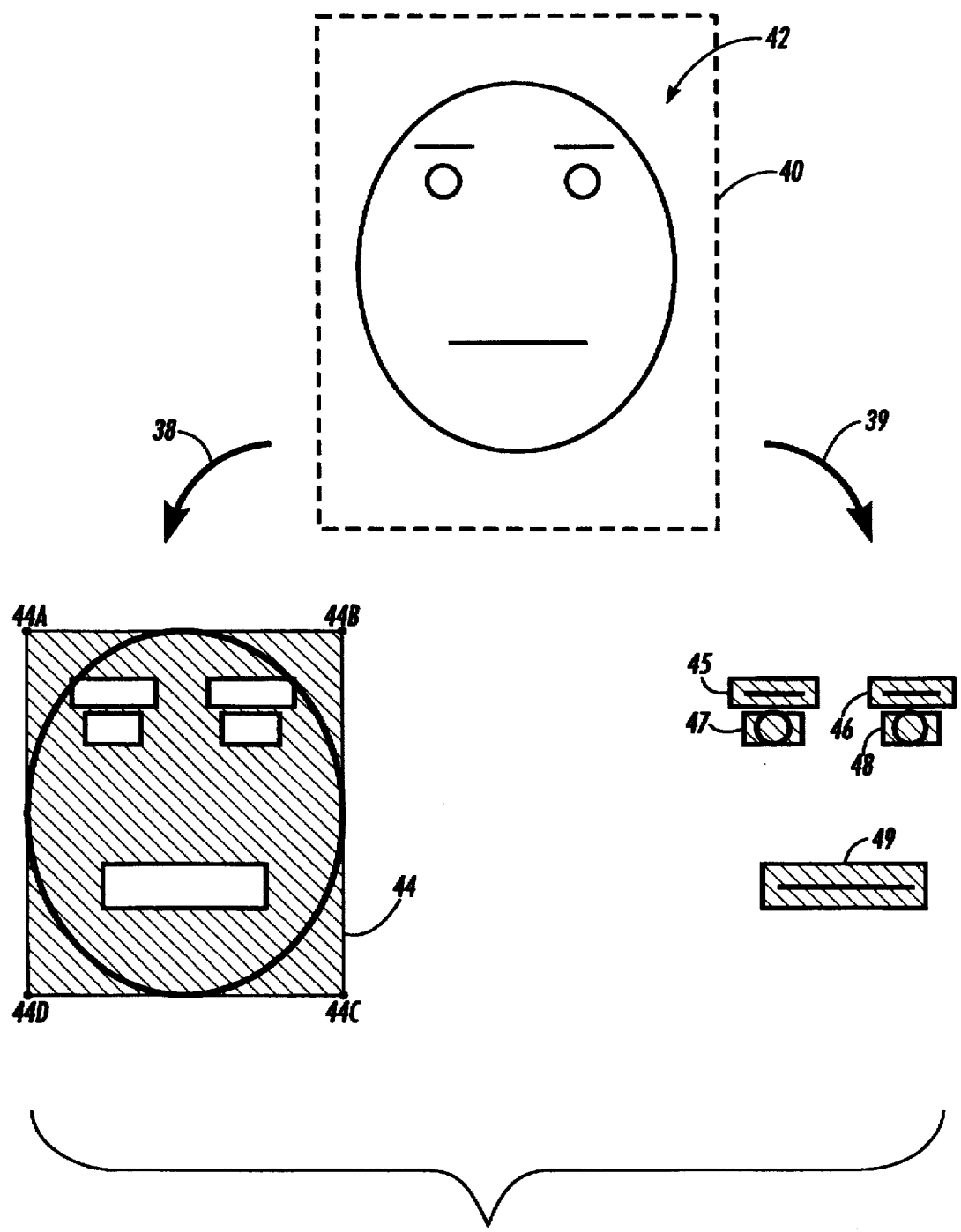
FIG. 2 illustrates segmentation to an image recording a user's face by the facial expression recognition system shown in FIG. 1.

FIG. 2 is an illustration of segmentation performed by the system 12 to a user's face recorded in an image. Initially, an image 40 of a user's face 42 is received by segmentation system 12. The image segmentation system 12 segments the image 40 into rigid and non-rigid regions, shown generally by arrows 38 and 39 respectively. A rigid region is defined herein as a region which undergoes a three dimensional transformation (i.e. translational plus rotational movement) between image frames. A non-rigid region is defined herein as an image region which may deform as well as undergo motion described by a three dimensional transformation. In general, the human mouth (non-rigid) tends to defined between image frames unlike the motion of a face (rigid). In FIG. 2, image 40 is segmented into a rigid region 44 and non-rigid regions 45–49. Specifically, rigid regions 44 represents the region of the face, non-rigid regions 45–49 represent eye regions 47 and 48, eye brow regions 45 and 46, and mouth region 49. In the preferred embodiment, the rigid region and non-rigid regions are represented using a set of points connected together as a polygon (or a richer curve such as contour). In a simpler embodiment, the face and eye regions are assumed to be rectangular in shape and are represented using four points of a quadrilateral, while non-rigid eyebrows and mouth regions are represented using a binary mask because of the potential for such non-rigid regions to deform. Segmentation is performed initially at the start of an image sequence and segmented at intervals over a sequence of image frames to insure proper tracking of the segmented image regions. Consequently, the segmentation system could concurrently operate with region tracking system 18 (described in detail later) to correct potential tracking errors.

The segmentation system 12 provides an initial set of facial regions to be tracked by the region tracking system 18. As new images are acquired by the sequence manager 10, the motion of a set of facial regions (e.g. rigid and non-rigid regions) between two images is computed by motion estimation system 16 using a set of parameterized motion models stored in a memory 20. Different parameterized motion models are used to describe the different facial regions. In the preferred embodiment, the face is modeled using a planar model. Alternatively a three dimensional model could be used to describe the head. Also in the preferred embodiment, the motion estimation system 16 uses a robust statistical procedure and computation of image gradients to calculate the motion of the set of facial regions. Alternatively, the motion estimation system 16 could compute the motion of the set of facial regions using correlation and interpolation, phase information, or fit parameterized models to optical flow vectors. Motion parameters recovered by the motion estimation system 16 provide a parametric description, or representation, of the motion between image frames. Once recovered, these motion parameters are input to region tracking system 18 and feature motion detector 22. The region tracking system 18 uses the motion parameters to update the location and shape of the facial regions, while the feature motion detector 22 uses the motion parameters to describe facial changes at each frame.

B. Motion Estimation Between Images

To recover motion between two images at time t and time t+1 in a sequence of images (I(t) ... I(t+n)) requires that the planar motion of the segmented face region 44 is estimated before the segmented facial feature regions 45–49 (e.g. mouth, eyes, and eyebrows). The motion parameters of the face region are estimated using a coarse-to-fine strategy that uses a robust regression technique to estimate image motion at each level. Once the face motion parameters are estimated, they are used to register the image at time t+1 with the image at time t by warping the image at t+1 back towards the image at t. Subsequently, the motion parameters of the facial feature regions (e.g. mouth, eyebrows, eyes) are estimated relative to the motion of the face region using the warped image with the coarse-to-fine strategy that uses robust regression.

B-1. Modeling Image Motion

With specific reference now to the motion estimation system 16, estimation of image motion requires the integration of information over a neighborhood of pixels in an image while making some assumptions concerning the variation of the motion within the pixel neighborhood. For instance, parameterized models of image motion make explicit assumptions about the spatial variation of the optical flow within a region of an image. Bergen et al. in "Hierarchical Model-Based Motion Estimation," Proc. of Second European Conference on Computer Vision, ECCV-92, Vol. 588 of LNCS-Series, pages 237–252, Springer-Verlag, May, 1992, discloses a typical assumption of parameterized models that the optical flow within a pixel region of an image can be represented by a low-order polynomial. Koenderink et al. in "Invariant Properties of the Motion Parallax Field Due to the Movement of Rigid Bodies Relative to An Observer," Optica Acta, 22(9):773–791, 1975, for example discloses that an affine model (defined below) of image motion is often sufficient to represent optical flow within small image regions.

The motion estimation system 16 uses parametric flow models to estimate motion of a rigid face and non-rigid facial regions. Each motion model used by the estimation system 16 is stored in a memory, or the like, on storage device 20. With reference again to FIG. 2, three parametric flow models are used by the preferred embodiment of the invention to model a face and its facial features: the face region 44 is modeled using a planar model; the eye regions 47 and 48 are modeled using an affine model; and the mouth region 49 and the brow regions 45 and 46 are modeled using an affine model that has an additional curvature parameter. Although the preferred embodiment of the present invention models the rigid motion of a face using a plane, it win be readily understood that alternative embodiments that use more complex models such as an ellipsoid or a three dimensional mesh could be used to model the rigid motion of a face. The advantage of using the planar model is that motion of the face can be described in a simple manner using eight parameters.

Figure 3:
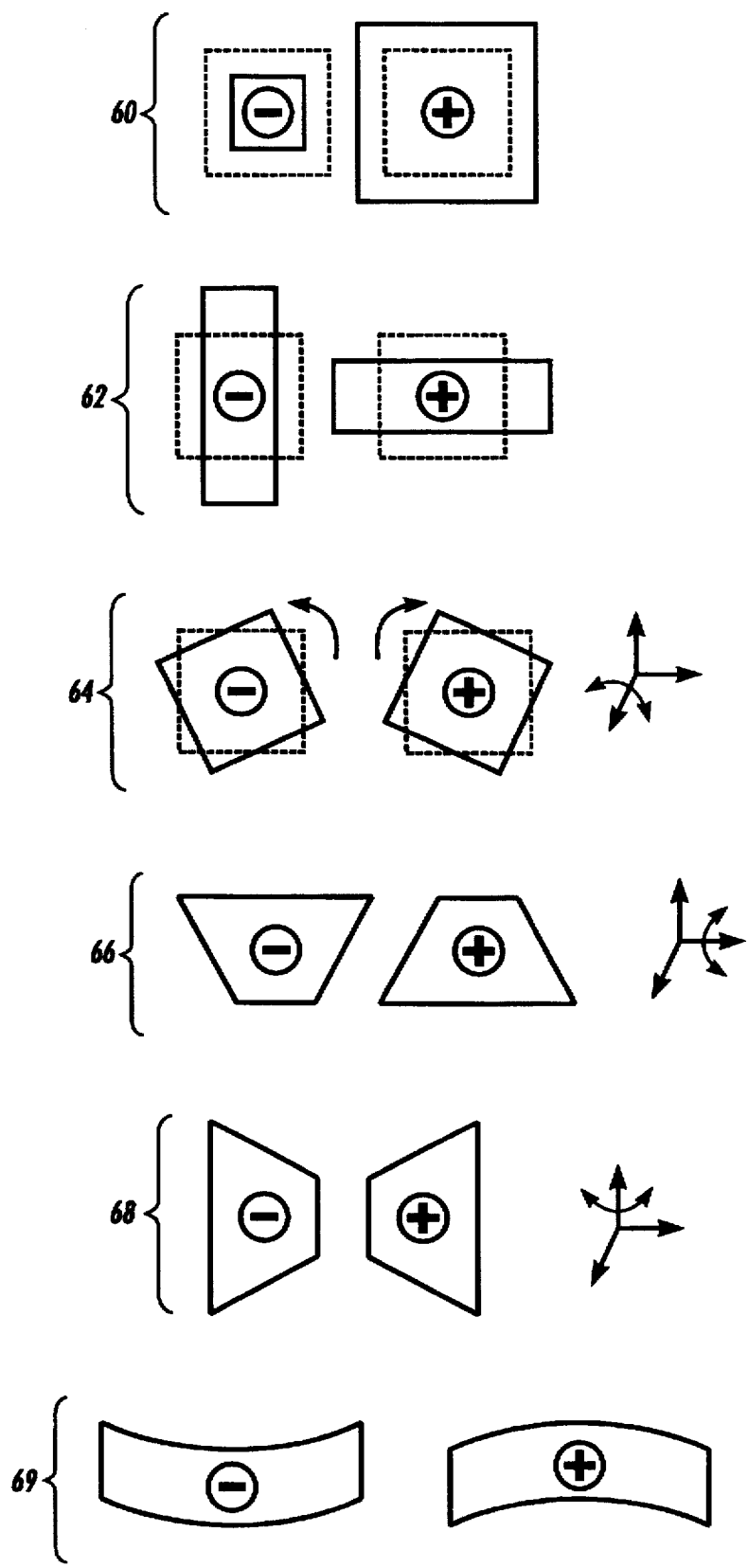
FIG. 3 image shows specific motion that can be described by parameters $a_0$–$a_5$, $p_0$, $p_1$, and c of the planar motion model, affine motion model, and affine with curvature motion model.

The affine model which is used to model motion of the eye regions 47 and 48 is defined as follows:

$$u(x,y)=a_0+a_1x+a_2y,$$

$$v(x,y)=a_3+a_4x+a_5y,$$

where $a_0$–$a_5$ are parameters to be estimated and $u(x,y)$ and $v(x,y)$ are the horizontal and vertical components of the flow at an image point $x=(x,y)$, respectively. The parameters $a_0$–$a_5$ individually and in combination are used to interpret image motion of eye regions 47 and 48. Individually, the parameters $a_0$ and $a_3$ represent horizontal and vertical translation, respectively. FIG. 3 illustrates other kinds of image motion described using motion parameters $a_0$–$a_5$: reference number 60 illustrates divergence (isotropic expansion) which is described by parameters $a_1+a_5$; reference number 62 illustrates deformation (squashing or stretching) which is described by parameters $a_1$–$a_5$; and reference number 64 illustrates image-curl (rotation about the viewing direction) which is described by parameters $a_4$–$a_2$. For example, eye blinking can be detected as rapid deformation, divergence, and vertical translation, when the motion of eye regions 47 and 48 is modeled using the affine model.

The affine model described above, however, is not sufficient to capture the image motion of a human face when the face occupies a significant portion of a field of view. Consequently, the present invention models the human face as a plane viewed under a perspective projection, even though a planar model may be a gross approximation of the shape of a face. Modeling the image motion of a rigid planar region of a scene can be described by the following well known eight-parameter model:

$$u(x,y)=a_0+a_1x+a_2y+p_0x^2+p_1xy,$$

$$v(x,y)=a_3+a_4x+a_5y+p_0xy+p_1y^2,$$

where parameters $p_0$ and $p_1$ are added to the affine model. Parameters $p_0$ and $p_1$ roughly correspond to image-yaw and image-pitch, respectively. With reference again to FIG. 3, reference number 68 illustrates image-yaw which is described by parameter $p_0$, and reference number 66 illustrates image-pitch which is described by parameter $p_1$. Although a face is neither planar nor strictly rigid, the simple planar model can be used to model image flow of a face using robust regression estimation techniques described below. Consequently, a planar model can be used in situations where there are gross errors or "outliers" due to non-planarity or non-rigidity to recover qualitative information about the motion of the head. In alternative embodiments, more sophisticated models could be used if accurate information about the three dimensional motion of the head is required. Even though these more complex models can be used to model rigid face motion, modeling the face region using a planar model has the advantage of being simple and expressive enough to robustly represent rigid facial motions in a variety of situations.

Non-rigid motions of facial features in the eyebrow regions 45 and 46, and mouth region 49, however, are not well captured by the rigid affine model or the planar model described above. In order to stay within the paradigm of using parametric models of image motion, the affine model is augmented to account for a primary form of curvature that appears in the mouth and eyebrow regions. Accordingly, the eyebrow and mouth regions of a face are described by the following modified affine model:

$$u(x,y)=a_0+a_1x+a_2y,$$

$$v(x,y)=a_3+a_4x+a_5y+cx^2,$$

where the additional parameter to the affine model is "c", which corresponds to curvature. With reference again to FIG. 3, reference number 69 illustrates curvature which is described by parameter "c". Even though the curvature parameter "c" is only able to capture very coarse curvature of facial features while not being able cope with asymmetric curvatures, this seven parameter model is able to capture the essential image motion of the mouth and eyebrow regions necessary for recognizing six universal facial expressions (e.g. happiness, sadness, surprise, fear, anger, and disgust).

Since the curvature parameter "c" is not invariant to head rotations, the curvature of the mouth and eyebrow regions are roughly oriented with the principle axis of the face. Thus, as described in detail below, to estimate the curvature of the mouth and eyebrow regions with respect to the coordinate frame of the face, the orientation of the principle axis of the face is computed and used to transform the images and features into the coordinate frame of the image plane. After, a curvature parameter "c" is estimated for the transformed image, the features of the original image are transformed back into the coordinate frame of the face for the purpose of tracking.

In an alternate embodiment, deformable models such as snakes (disclosed by Kass et al. above) could be used to provide good tracking of eyebrow and mouth regions. The distributed nature of deformable models, how ever, does not admit simple and intuitive characterizations of the facial motions that can be described using the modified affine model. Deformable models necessitate additional analysis to extract meaningful descriptions of facial motion. Further methods that could be used to describe non-rigid motion of facial features include using parameterized curve models for tracking, and deformable templates that encode information about shape but not motion as described by Yuille et al., 1992 (cited above).

B-2. Determining Motion Parameters of Image Flow Models

Figure 4:
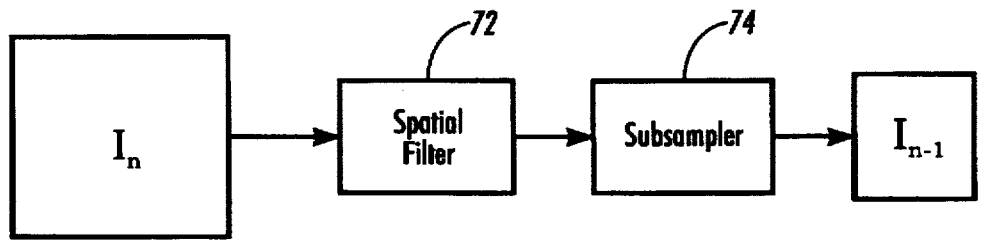
FIG. 4 illustrates an image segment (or region) $I_n$ being spatially filtered and then subsampled to produce a coarser image segment $I_{n-1}$, as part of a course-to-fine strategy for estimating motion parameters for the image regions segmented in FIG. 2.
Figure 5:
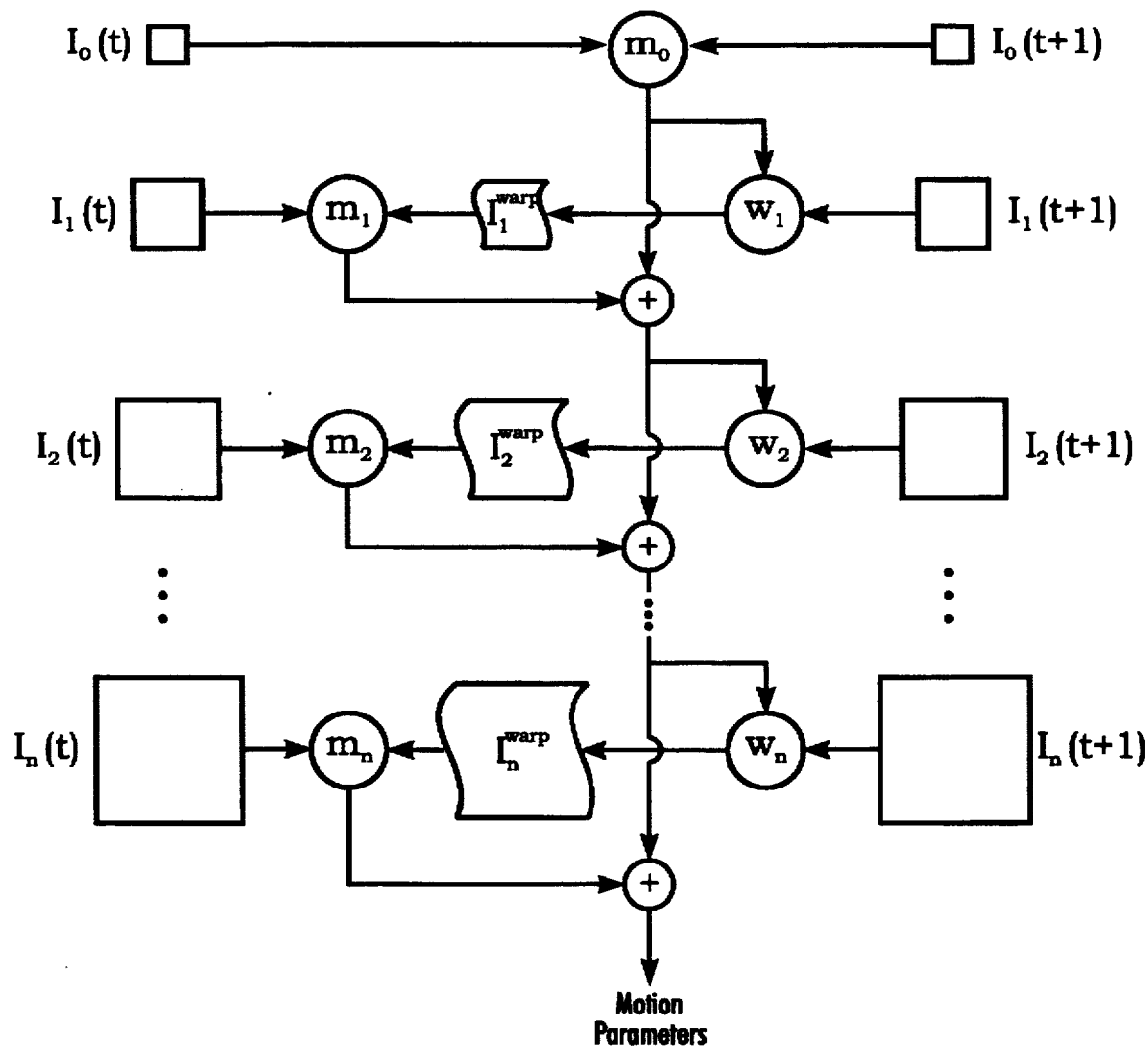
FIG. 5 illustrates how two image segments $I_t$ and $I_{t+1}$ of an image sequence are evaluated using a coarse-to-fine strategy that uses robust estimation to determine motion parameters for the image regions segmented in FIG. 2.

The parameters of the simple parametric models which are used to model rigid and non-rigid facial motion are estimated using a robust regression technique that makes recovered motion parameters stable under adverse conditions such as motion blur, saturation, loss of focus, etc. In addition to the robust regression technique, a generally known coarse-to-fine strategy is used to estimate the motion parameters in order to cope with large motions between a sequence of images (I(t) . . . I(t+n)). FIG. 4 and FIG. 5 illustrate how motion parameters are determined for two image segments $I_t$ and $I_{t+1}$ of an image sequence. FIG. 4, shows how an image segment $I_n$ is spatially filtered and then subsampled, as shown generally by reference number 72 and 74, to produce course image segment $I_{n-1}$. Depending on the number of iterations of the course-to-fine strategy, each image segment I will be spatially filtered and subsampled "n" times to construct a Gaussian pyramid. Building Gaussian pyramids or Laplacian pyramids are described by Burt in "Attention Mechanisms for Vision in a Dynamic World," IEEE, 1988. FIG. 5 illustrates two image segments $I_t$ and $I_{t+1}$ of an image sequence that are evaluated using the coarse-to-fine strategy using robust estimation of the motion parameters for the images. A coarse-to-fine strategy is described by Burt in detail in "Multiresolution Techniques for Image Representation, Analysis, and 'Smart' Transmission," SPIE Conf. 1199, Visual Communications and Image Processing IV, Philadelphia, November 1989. Each image $I_n(t)$ and $I_n(t+1)$ is spatially filtered using filter 72 and then subsampled using subsampler 74 as indicated by images $I_2(t)$, $I_1(t)$, and $I_0(t)$, and images $I_2(t+1)$, $I_1(t+1)$, and $I_0(t+1)$, respectively.

Initially, motion parameters $M_0$ defining motion between images (or image segments) $I_0(t)$ and $I_0(t+1)$ are estimated by evaluating the optical flow between the two images $I_0(t)$ and $I_0(t+1)$ as shown in FIG. 5. The optical flow between two images is the apparent motion of brightness patterns. These brightness patterns move as objects that give rise to the patterns move. By making the assumption that brightness between two images does not change over time (i.e. the brightness constancy assumption), the optical flow between two images can be defined by a set of motion parameters.

The robust estimation technique used in the preferred embodiment to estimate each set of motion parameters (e.g. $M_0$, $M_1$, $M_2$, and $M_n$) is described in detail by Black et al. in "The robust estimation of multiple motions: Affine and piecewise-smooth flow fields," Technical Report P93-00104, Xerox PARC, December 1993, and by Black et al. in "A Framework for The Robust Estimation of Optical Flow," Proc. Int. Conf. on Computer Vision, ICCV-93, pages 231–236, Berlin, Germany, May 1993, the pertinent portions of each are incorporated herein by reference. Specifically, the robust estimation technique described by Black et al. used recover the motion parameters of the affine model, the planar model, and the affine with curvature model is summarized below. For convenience of notation each model is defined using the following matrix notation:

affine: u(x; A)=X(x)A,
planar: u(x; P)=X(x)P, and
affine with curvature: u(x; C)=X(x)C,
where, $u=[u,v]^T$, $$X(x) = \begin{bmatrix} 1 & x & y & 0 & 0 & 0 & x^2 & xy & 0 \\ 0 & 0 & 0 & 1 & x & y & xy & y^2 & x^2 \end{bmatrix},$$

$A=[a_0\ a_1\ a_2\ a_3\ a_4\ a_5\ 0\ 0\ 0]^T$,
$P=[a_0\ a_1\ a_2\ a_3\ a_4\ a_5\ P_0\ P_1\ 0]^T$,
$C=[a_0\ a_1\ a_2\ a_3\ a_4\ a_5\ 0\ 0\ c]^T$.

In addition, let $f$ be a set of image points corresponding to a face region (i.e. a region excluding non-rigid facial features such as face region 44 shown in FIG. 2), and let $P_f$ be the planar motion parameters of the set of image points in the face region. The brightness constancy assumption for the face region states:

$I(x,t)=I(x-X(x)P_f, t+1)\ \forall x \in f$, where I is the image brightness function and t represents time. Taking the Taylor series expansion of the right hand side, simplifying, and dropping terms above first order results in the following simplified equation:

$\nabla I(X(x)P_f)+I_t=0,\ \forall x \in f$, where $\nabla I=[I_x,I_y]$, and the subscripts x and y, and t indicate partial derivatives of image brightness with respect to the spatial dimensions and time.

To estimate the parameters $P_f$ the following sum is minimized:

$$\sum_{x \in f} \rho(\nabla I(X(x)P_f + I_t, \sigma),$$

for some error norm $\rho$ where $\sigma$ is a scale parameter. Since the face is neither a plane nor is the face rigid, $\rho$ should be taken to be a robust error norm which can cope with some percentage of gross errors or "outliers," as disclosed by Hampel et al. in "Robust Statistics: The Approach Based on Influence Functions," John Wiley and Sons, New York, N.Y., 1986. Accordingly, $\rho$ is taken herein to be:

$$\rho(x,\sigma) = \frac{x^2}{\sigma + x^2},$$

which is the robust error norm described by German et al. in "Statistical Methods for Tomographic Image Reconstruction," Bulletin of the International Statistical Institute, LII-4:5–21, 1987. In alternative embodiments, $\rho$ could be represented in many different ways. As the magnitudes of the residuals of "$\nabla I(X(x)P_{71})+I_t$" grow beyond a certain point, their 'influence' on a solution for the sum begins to decrease and the value of $\rho(\cdot)$ approaches a constant. The value $\sigma$ is a scale parameter that effects the point at which the influence of outliers begins to decrease.

The sum used to estimate the parameters $P_{71}$ is minimized using a simple gradient descent scheme with a continuation method that begins with a high value for $\sigma$ and lowers it during the minimization as described by Black et al. The effect of using the simple gradient descent scheme is that initially no data points are rejected as outliers then gradually the influence of outliers is reduced. For example, for each pair of images in a sequence of images, a four level Gaussian pyramid was used with fifteen iterations of gradient decent at each level in the course-to-fine strategy shown in FIG. 5. The motion at one level of the pyramid was used to register each pair of images before refining the estimate at the next finer level. The value of $\sigma$ began at $15.0\sqrt{3}$, was lowered by a factor of 0.95 after each iteration, and was reset at each level in the Gaussian pyramid.

With reference again to FIG. 5, the motion parameters $M_0$ of two image segments $I_t$ and $I_{t+1}$ (i.e. the motion between time t and time t+1) at the coarsest level is estimated using the robust regression technique described above. Subsequently, at the next finer level, the image segment $I_1$ at time t+1 is shifted or warped towards the image $I_1$ at time t using the current motion estimate $M_0$ to form warped image $I_1^{warp}$. Generally, an image or image segment I that has been warped in accordance with a set of motion parameters is given by the following equation:

$I^{warp}(x,y)=I[x+u(x,y,a), y+v(x,y,a)]$, where u and v are the x and y components of an optical flow vector at point (x,y), and a is a vector of parameters (e.g. A, P, or C). After warping the image $I_0(t+1)$ towards image $I_0(t)$, the motion parameters are refined at the next level $M_1$.

After each iteration, the refinement of the motion parameters $M_n$ is added to the previous set of motion parameters $M_{n-1}$. This process continues until a final set of motion parameters have been evaluated. The final set of motion parameters is given by $M=(M_0+M_1+M_2+ \ldots +M_n)$.

In summary, recovery of a set of motion parameters between a pair of images in an image sequence requires that motion parameters for a segmented face region be determined before recovering motion parameters for segmented facial feature regions. The sets of motion parameters for the different regions are recovered using a coarse-to-fine strategy that uses robust estimation at each level of a Gaussian pyramid. Motion parameters recovered for the face image region are used to warp the pair of images together so that the motion parameters of the facial features can be estimated relative to the motion of the face region. Once motion parameters for each segmented image region have been estimated, these parameters are used by region tracking system 18 to track the features in the second image or by the feature motion detector 22 to identify motion of facial features occurring between the two images.

C. Tracking Image Motion Between Images

With reference again to FIG. 1, motion parameters output from motion estimation system 16 are used by region tracking system 18 to track segmented face, eye, eyebrow, and mouth regions originally segmented by image segmentation system 12. By tracking segmented regions of the first image in a sequence of images (I(t) ... I(t+n)), subsequent images in the sequence of images (I(t) ... I(t+n)) do not have to be segmented to determine where image segments of interest are located. Instead, motion parameters are used by subsequent images to track the motion of originally segmented regions from the first image to a subsequent image. The image segmentation system 12, however, will be invoked by region tracking system 18 if the locations of tracked image regions are determined to be below confidence measurements. These confidence measurements can either be defined using a predefined fixed number of frames or a more dynamic measurement such as the relative location of each image segment in the image or a statistical test on residual values. Output from the region tracking system 18 is therefore used by motion estimation system 16 to determine the location of image regions in a subsequent image in a sequence of images (I(t) ... I(t+n)). Additionally, output from region tracking system 18 can be used by application driver 30 in tracking input to the facial expression recognition system 4.

Specifically, the motion parameters describing motion of the face and facial features estimated between two frames at time t and t+1 in a sequence of images (I(t) ... I(t+n)) are used to predict the locations of the regions in which the features in the next frame are located. With reference again to the segmented image 40 shown in FIG. 2, the face region 44 and the eye regions 47 and 48 are defined by the region tracking system 18 as simple quadrilaterals. A simple quadrilateral is represented by the locations of its four corners in the image 40. For example, the face region 44 is represented by corners 44A, 44B, 44C, and 44D in image 40.

More specifically, the location of each of the four corners of the face region 44 and the four corners of the eye regions 47 and 48 are tracked in a second image at time t+1 by applying the planar motion parameters of a first image at time t to get $X(x)P_f+x$. Because the eye regions were originally warped back to the first image at time t, the relative motion of the eye locations must be accounted for when tracking the location of the eye regions 47 and 48 in the second image at time t+1. Consequently, the location of the corners of the eye regions 47 and 48 are further adjusted to become $(X(x)P)A_{le}+x$ and $(X(x)P)A_{re}+x$ where le and re correspond to the motions of the left and right eye regions respectively. However, the full affine model described above is not used when updating the eye region movement between images since eye blinking causes a tracked eye region to deform to the point where the eye region could no longer be tracked. Thus, to cope with eye blinking, only the horizontal and vertical translation of the eye regions are used to update their locations relative to the face motion when tracking eye regions from image to image.

Because of the mouth region 49 and brow regions 45 and 46 are modeled using an affine model with curvature, the mouth and brow regions cannot be defined using a simple quadrilateral to accurately track changes of curvature in those regions. Instead, image masks, such as a binary mask, are used to represent the regions of an image that correspond to the brow regions and the mouth region. Similar to the eye regions, the mouth and eyebrow regions must account for the relative motion of the mouth and eyebrow regions between the first image and the second image which was warped back to the first image. Thus, to account for the relative motion of the regions, the binary masks representing mouth and eyebrow regions are updated by warping them first by the planar face motion $P_f$ and then by the motion of the individual features $C_m$, $C_{lb}$, and $C_{rb}$ which correspond the mouth and the left and right brows respectively.

D. Motion Parameter Filtering

A simple temporal filter is used to reduce noise in estimated motion parameters before input to feature motion detector 22 using a simple averaging scheme. Alternatively, temporal filtering can be performed before tracking an image region. For example, let $P_{f_1}^+$ be the filtered parameters of the face and $P_f$ be the current estimate of the face parameters, where $P_f^+$ is updated as follows:

$$P_f^+ = \frac{1}{2}(P_f^+ + P_f).$$

This temporal filter is also applied to the relative facial feature motion parameters (e.g. mouth, eye, and eyebrow regions). These smoothed values of the face and facial feature parameters are used for expression recognition by feature motion detector 22. This temporal filter has the property of weighting current estimates more heavily than previous estimates. This is an appropriate property for facial expressions which are in image sequences less than several hundred images.

Alternatively, more sophisticated filtering schemes could be used for image sequences that are longer than several hundred images, such as Kalman filtering (as disclosed by Azarbayejani et al. in "Visually controlled graphics," IEEE Transactions on Pattern Analysis and Machine Intelligence, 15(6):602–604, June 1993). In addition, segmentation information, and spatial constraints on the locations of features could be used to check for consistency of motion estimates and to reduce noise.

E. Illustrative Sequence

Figure 6:
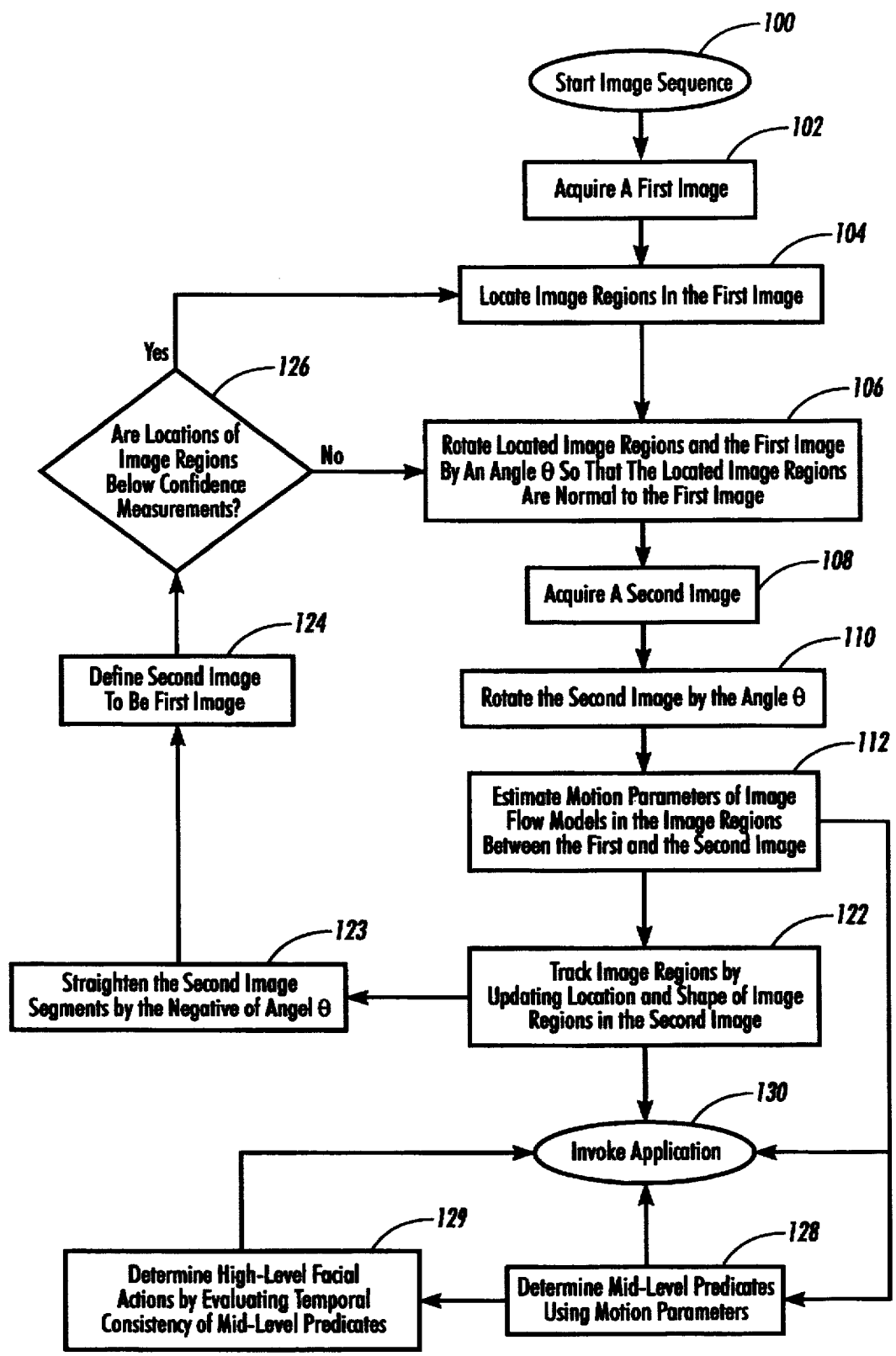
FIG. 6 is flow chart showing the general steps involving the generation of motion parameters between two images in a sequence of images (I(t) ... I(t+n))
Figure 7:
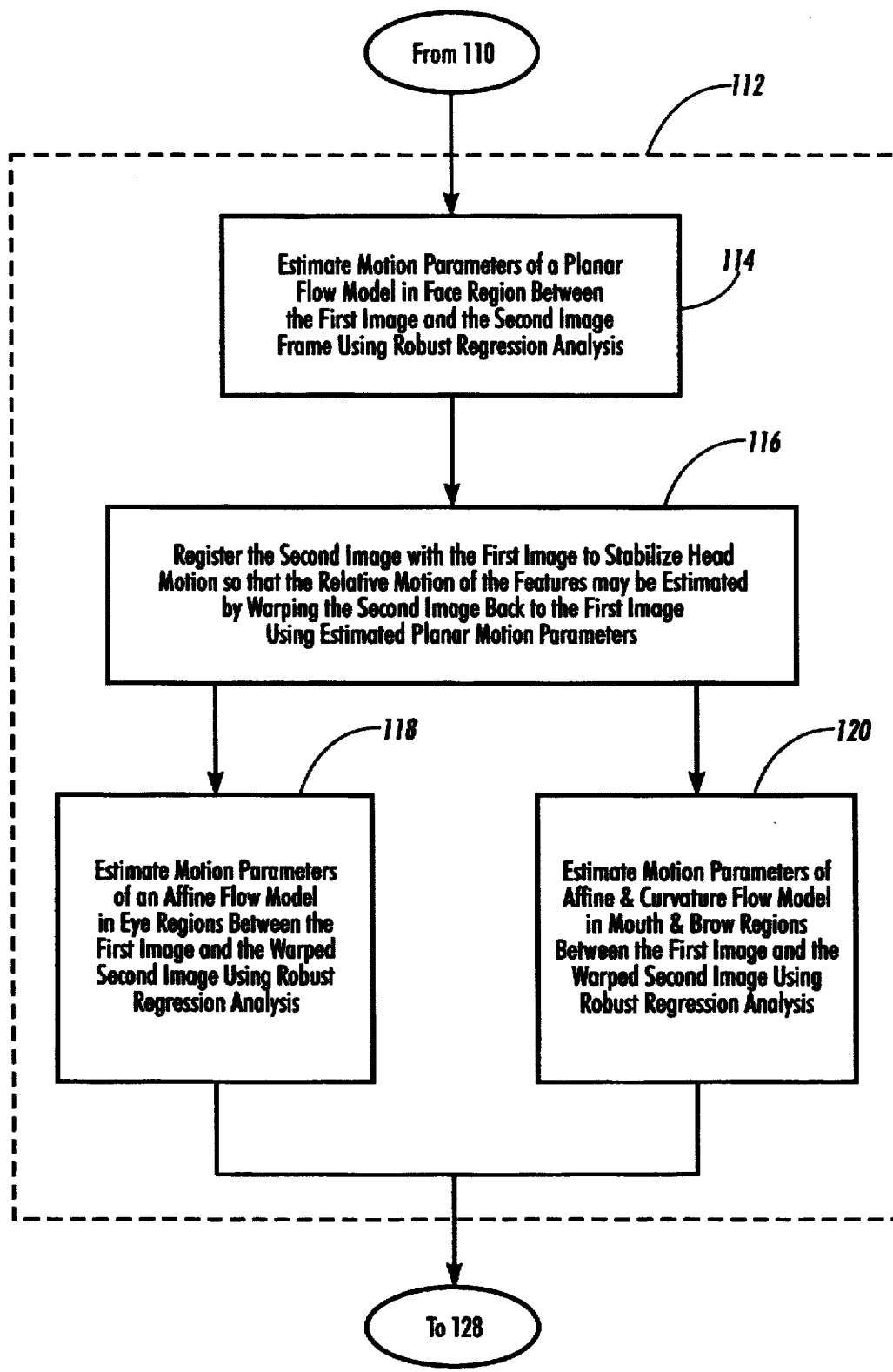
FIG. 7 is a flow chart of the detailed steps to perform the step 112 of estimating motion parameters of image flow models between the first and the second image shown in FIG. 6.

FIG. 6 and FIG. 7 are flow charts showing the general steps involving the generation of motion parameters between two images in a sequence of images (I(t) ... I(t+n)). In addition, FIGS. 8A–8M illustrate how two images in a sequence of images are manipulated in accordance with the steps shown in FIGS. 6 and 7 to estimate a set of motion parameters that describe motion between the two images. With reference now to FIG. 6, at step 100 an image sequence is acquired by the image acquisition system 8 and transmitted to image sequence manager 10. The image sequence can be acquired either completely before invoking motion estimation system 16 or "on the fly" while the system 4 is processing motion parameters for acquired images.

Specifically, once a first image 131 has been acquired at step 102 by image sequence manager 10, the image is stored in memory 14 for processing by image segmentation system 12. The first image 131 is defined as image $I_1$ at time (t) in the sequence of images (I(t) . . . I(t+n)) that represent a human face which is shown generally by reference number 132. At step 104, image segmentation system 12 segments the first image 131 into a plurality of image regions 44–49. Each region shown corresponds to the segmented regions shown in FIG. 2 (e.g. the rigid face region 44, and the non-rigid eye regions 47–48, the non-rigid eyebrow regions 45–46, and the non-rigid mouth region 49). At step 106, the segmented image 131 is received by motion estimation system 16 and rotated to facilitate operations on the first image 131. Image 131 is rotated by an angle θ to form image 134 ($I_1^{rot}$(t)) shown in FIG. 8D. Image 134 is rotated by angle θ so that the segmented face region 44 is perpendicular to the frame of reference of image 134.

Figure 8A:
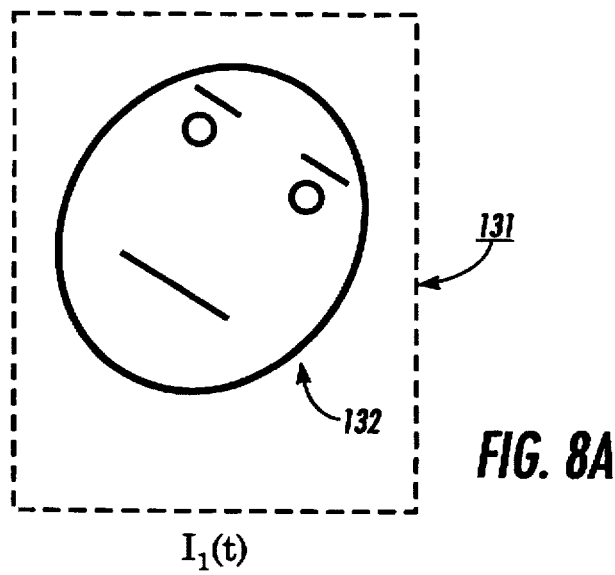
FIGS. 8A–8M illustrate how two images in a sequence are operated on in accordance with the steps shown in FIGS. 6 and 7 to estimate a set of motion parameters that describe motion between the two images.
Figure 8B:
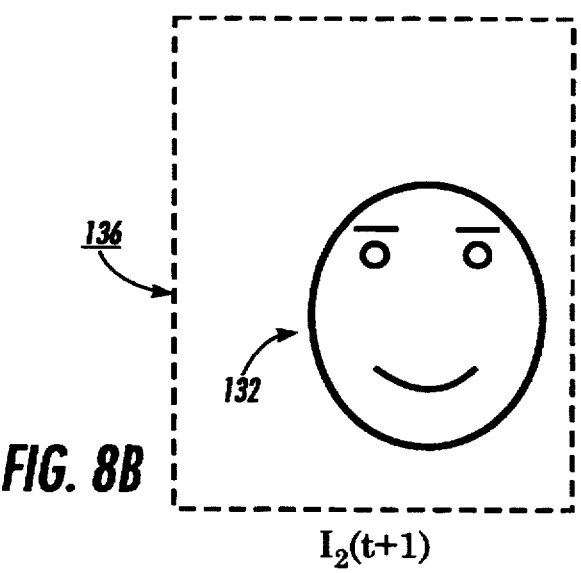
Figure 8C:
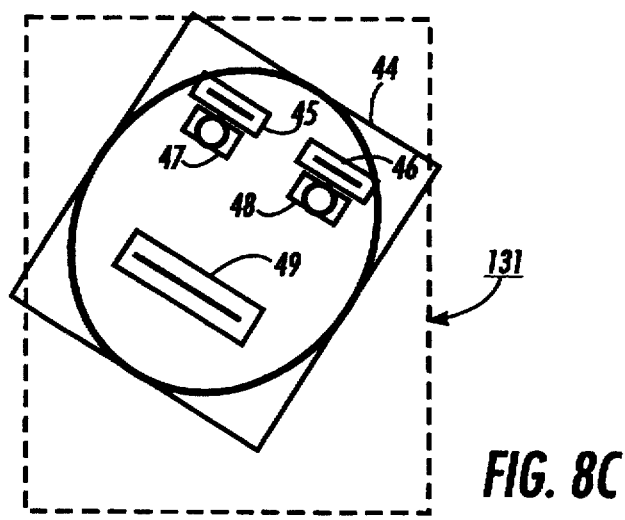
Figure 8D:
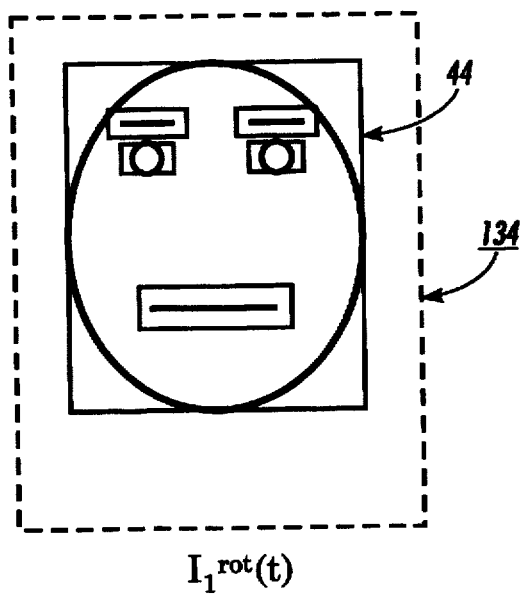
Figure 8E:
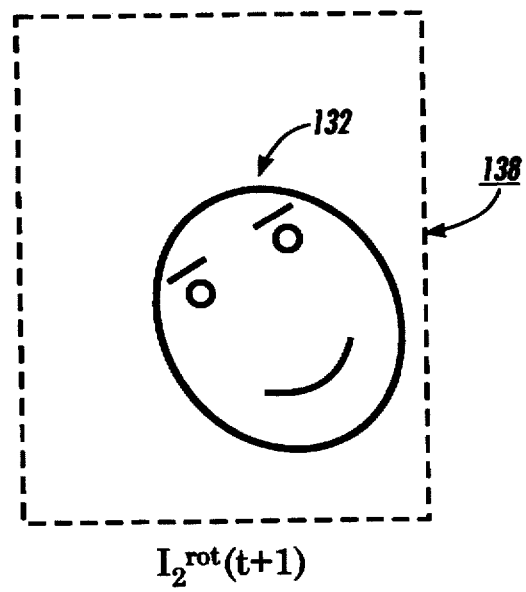

At step 108, sequence manager 10 acquires a second image 136 shown in FIG. 8B. The human face 132 in FIG. 8B changed position relative to FIG. 8A by moving into the background, by moving south-east from the center, and by rotating to the right. The second image 136 is defined as image $I_2$ at time (t+1) in the sequence of images (I(t) . . . I(t+n)) representing human face 132. At step 110, the image 136 is received by motion estimation system 16 and rotated by angle θ to form image 138, which is defined as $I_2^{rot}$(t+1). At step 112, motion parameters for image regions 44–49 are determined by motion estimation system 16.

Figure 8F:
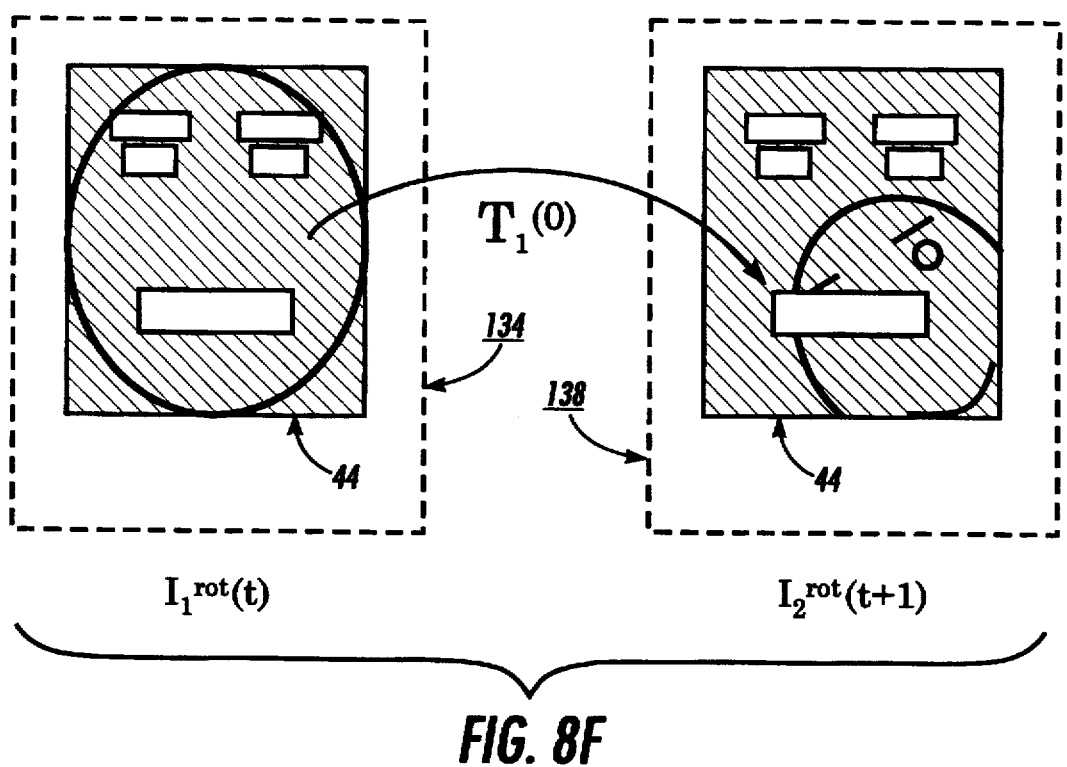
Figure 8G:
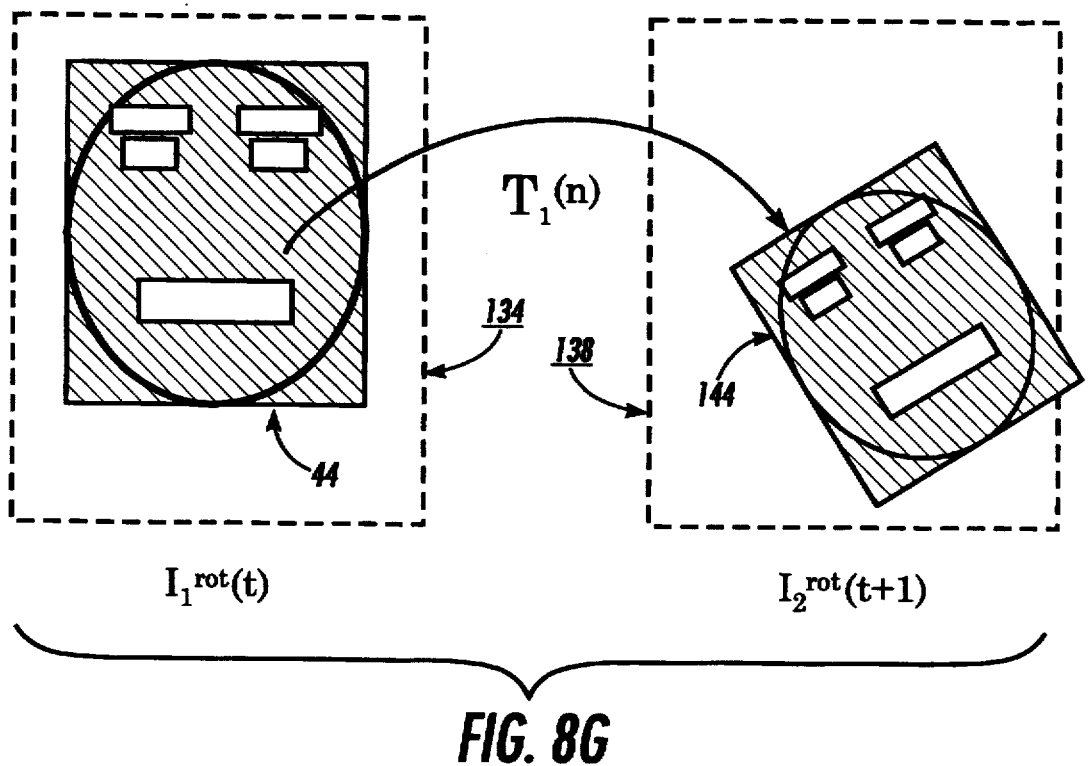

With reference now to FIG. 7 where step 112 is shown in detail, initially at step 114, motion parameters of the face region 44 are modeled using a planar model. The motion parameters of the face region 44 are estimated using a coarse-to-fine strategy with robust regression as shown in FIGS. 4 and 5 and described above. FIG. 8F illustrates how the first iteration of the coarse-to-fine strategy uses the segmented region 44 in image 138 to estimate a set of motion parameters $T_1^{(0)}$ between image 134 and image 138. The coarse-to-fine strategy continues until a set of motion parameters $T_1^{(n)}$ is estimated that correctly determines that face region 44 in image 134 has moved to face region 144 in image 138, as shown in FIG. 8G.

Figure 8H:
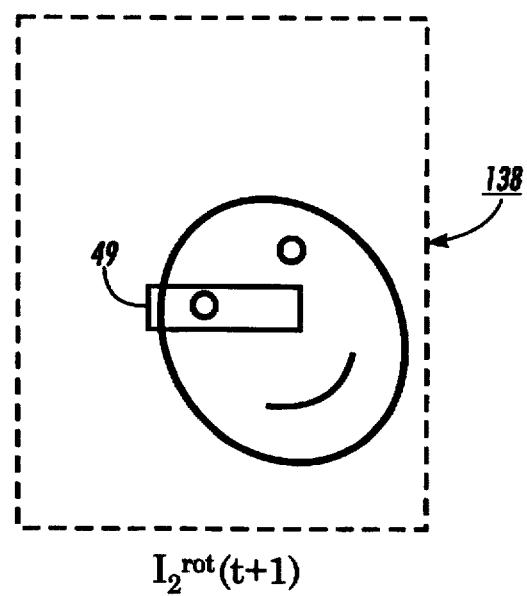
Figure 8I:
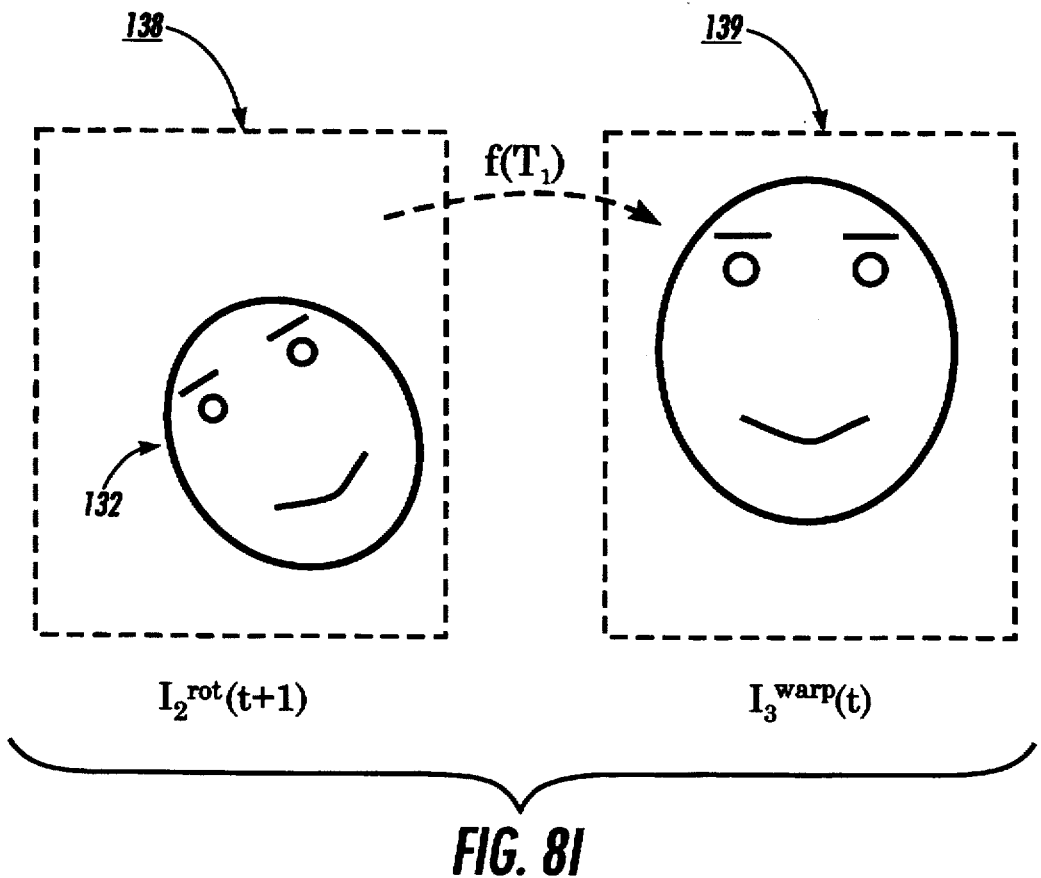
Figure 8J:
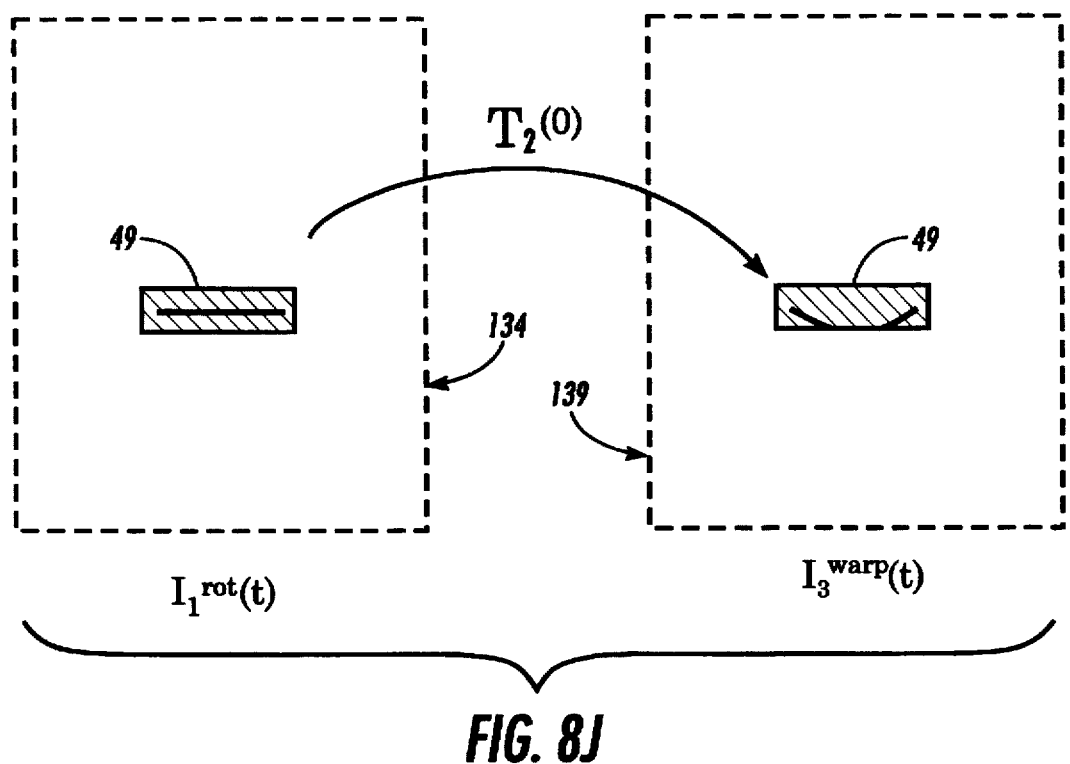
Figure 8K:
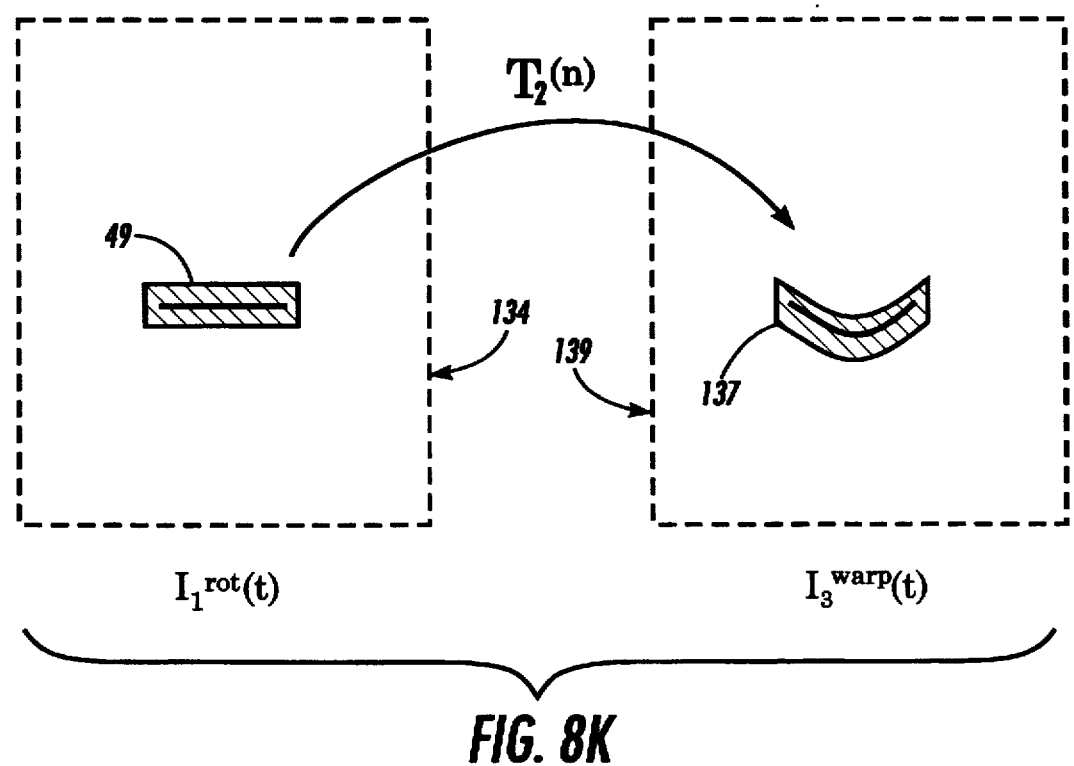
Figure 8L:
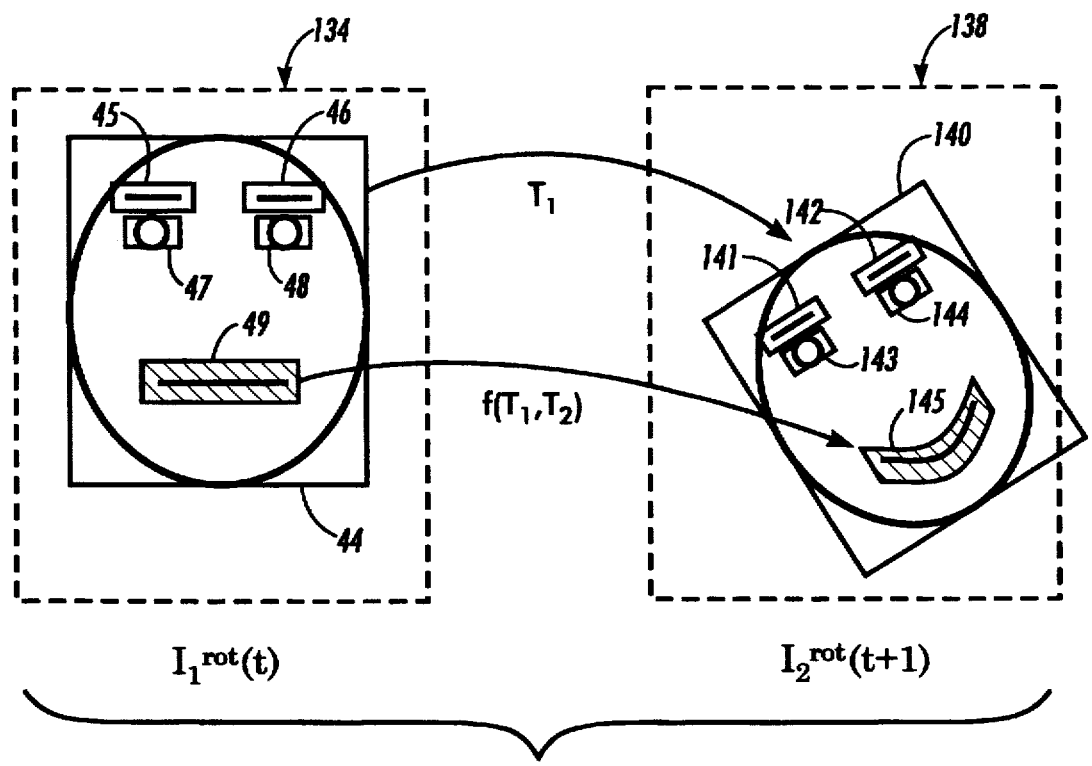

At step 116, the second image 138 is warped back or shifted back in accordance with the set of motion parameters $T_1$ calculated at step 114 to form warped image 139 ($I_3^{warp}$(t)), as shown in FIG. 8L. The warped image 139 stabilizes the facial feature regions (e.g. mouth, eyes, and eyebrows) with respect to face region in the first image 134 at time t by accounting for the relative motion of the face region 44 between the first image 134 ($I_1^{rot}$(t)) and the second image 138 $I_2^{rot}$(t+1). For example, FIG. 8H shows second image 138 with the mouth region 49 superimposed over it. If motion parameters were estimated for the region defined by mouth region 49 there would be very little correlation between the image signals in that region to determine any motion that can be refined at a next finer level of motion estimation. Although image registration for the present invention has been described by warping or shifting an image "back", it will be readily understood that facial features in a pair of images can be registered by shifting in a "forward" direction. In addition, it will also be understood that facial features can be registered between a pair of images by defining the regions of the facial features as a function of motion parameters that represent the face region.

By defining the facial features as a function of motion parameters representing the face region, the motion parameters describing motion of image features between a pair of images can be determined without creating an intermediate warped image.

At step 118, motion parameters of the eye regions 47 and 48 are estimated between the first image 134 and the warped image 139 using an affine model. Similarly, at step 120, motion parameters of the mouth region 49 and the eyebrow regions 45 and 46 are estimated using an affine model with a curvature parameter. Each set of motion parameters for the mouth, eyes, and eyebrows are estimated using the coarse-to-fine strategy with robust regression analysis used to estimate the facial motion parameters $T_1$ calculated at step 114. For example, mouth region 49 is initially overlaid over warped image 139 as shown in image 139 $I_3^{warp}$(t) in FIG. 8J. The motion parameters $T_2^{(0)}$ between the first image 134 and the warped image 139 are estimated in a first iteration of the coarse-to-fine strategy with robust regression as shown in FIG. 8J. (Because image 138 was warped, mouth region 49 is able to capture some of the mouth movement in image 139 $I_3^{warp}$(t) in FIG. 8J while it could not previously capture any movement in image 138 $I_2^{rot}$(t+1) FIG. 8H.) The final iteration of the coarse-to-fine strategy is shown in FIG. 8K. In the final iteration, motion parameters $T_2^{(n)}$ are calculated and the mouth region 137 determined. The motion parameters that define motion between the eye regions 47–48 and the eyebrow regions 45–46 in first image 134, and new eye and eyebrow regions (not shown) in the warped image 139 are determined in a similar manner as the mouth region.

With reference again to FIG. 6, at step 122, motion parameters for the face, mouth, eye, and eyebrow image regions determined at steps 114, 118, and 120 are used to track the location of those regions (the location of which were determined originally by segmentation system 12). For example, the image regions 44–49 in the first image 134 in a sequence of images (I(t) . . . I(t+n)) at time t are tracked to image regions 140–145 in the subsequent image 138 at time t+1, as shown in FIG. L. The face region 44 is tracked to face region 140 by representing the corners of region 44 as a quadrilateral and by applying planar motion parameters $T_1$ to the region 44 of image 134. In order for the mouth region 49 to track the mouth region 145, the relative motion between the first image 134 and the second image 138 must be taken into account by applying both the planar motion parameters $T_1$ and the affine with curvature motion parameters $T_2$ when tracking or predicting where region 49 is in image 138. In a similar manner to the face region 44, the eye regions 47 and 48 are tracked to eye regions 143 and 144 while accounting for the relative motion for those regions. In addition, to account for possibility of blinking only the horizontal and vertical translations of regions 47 and 48 are used to track regions 47 and 48 to image 138. Also, the eyebrow regions 45 and 46 are tracked in a similar manner as mouth region 49 was tracked to mouth region 145 in image 138.

Figure 8M:
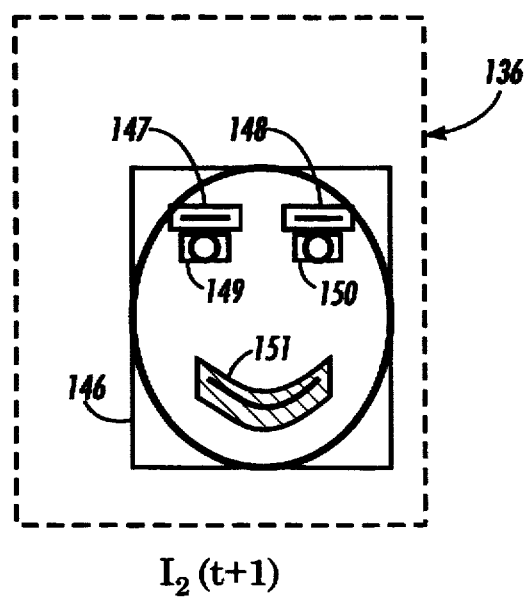

At step 123, image 138 is straightened to account for the rotation of image 136 at step 110 by negative of the angle θ. Accordingly, the image regions 140–145 in image 138 shown in FIG. 8L are rotated to form image regions 146–151 shown in FIG. 8M. The location of image regions 146–151 are rotated so that they correspond with the original second image 136 ($I_2$(t+1)) as shown in FIG. 8M.

With the predicted or tracked image regions for the face, mouth, eyes, and eyebrows, the second image $I_2$(t+1) is redefined at step 124 to be the first image $I_1$(t+1) (i.e. the first image but at time t+1 in the sequence of images (I(t) ... I(t+n))). At step 126, the tracked image regions are evaluated for accuracy. The method used at step 126 to evaluate region tracking can be based on predictive confidence measurement that would evaluate where each region is with respect to the other regions. Alternatively, the method used at step 126 can be a simple threshold that determines if N frames have elapsed, at which point it is necessary to segment the current image $I_2(t+1)$. When using either the predictive method or the threshold method, if the image regions are below some confidence measurement, the newly defined first image $I_2(t+1)$ at step 124 is input to segmentation system 12 at step 104 to locate a new set of image regions. If the location of the image regions in the newly defined first image $I_2(t+1)$ are above confidence measurements, the tracked regions (e.g. regions 146–151) and the image $I_1(t+1)$ are rotated so that the face region is normal or vertically aligned to the image frame, at step 106. Whether image regions are below or above confidence measurements, a third image in the sequence of images (I(t) ... I(t+n)) is acquired and defined to be the second image at step 108. Specifically, the second image at step 108 would be defined at image $I_2(t+2)$, however, the image $I_2(t+2)$ would be the image at time t+2 in the sequence of images (I(t) ... I(t+n)) acquired by sequence manager 10.

Accordingly, each image in a sequence of images (I(t) ... I(t+n)) acquired by sequence manager 10 is processed according to the flow diagram shown in FIGS. 6 and 7. As the motion parameters for each segmented region of the face, mouth, eyes, and eyebrows are processed at step 112, they are input to feature motion detector 22, which is described in detail below. At step 128, the feature motion detector 22 determines mid-level predicates using instantaneous models stored in memory 24. At step 129, high-level facial actions are determined by expression and gesture recognition detector 26 by evaluating the temporal consistency of the mid-level predicates using temporal models stored in memory 28. From steps 112, 122, 128, or 129, application driver 30, examples of which are provided below, can be invoked at step 130 by either motion estimation system 16, region tracking system 18, feature motion detector 22, or expression and gesture recognition detector 26.

F. Instantaneous Motion Representation—Semantic Descriptions of Facial Motion

Once facial motion is described by motion estimation system 16 using a plurality of parametric motion models, parameters recovered from the motion models are input to feature motion detector 22. These recovered motion parameters provide a description, or representation, of the motion between two image frames in a sequence of images. For example, motion of features between two images in a sequence can be determined using estimated values for parameters that correspond to divergence, curl, deformation, and translation of the instantaneous motion. The feature motion detector 22 performs discrete analysis of the recovered motion parameters to recognize predefined gestures using instantaneous models stored in memory 24.

Specifically, feature motion detector 22 uses motion parameters, such as translation and divergence, estimated for each feature by motion estimation system 16 to derive mid-level predicates that characterize the motion of each feature segmented by image segmentation system 12. Initially feature motion detector 22, thresholds motion parameters received from motion estimation system 16 to filter out most of the small and noisy estimates made by motion estimation system 16. Feature motion detector 22 uses these thresholded motion parameters to derive mid-level representations that describe observed facial changes between two frames in an image sequence. In one embodiment, the mid-level predicates for the mouth region 49 (shown in FIG. 2) are derived by thresholding the motion parameters of the affine model with curvature as shown in Table 1. The threshold values shown in Table 1 are derived using empirical data. Specifically, Table 1 list the parameters of the affine model in the first column, their threshold values in the second column, and the resulting mid-level predicate values in the third column. Similar thresholding schemes are used to derive the eye and eyebrow regions.

TABLE 1

| Parameter | Threshold | Mid-Level Predicates |
|---|---|---|
| $a_0$ | >0.25 | Mouth rightward |
|  | <−0.25 | Mouth leftward |
| $a_3$ | <−0.1 | Mouth upward |
|  | >0.1 | Mouth downward |
| Div | >0.02 | Mouth expansion |
|  | <−0.02 | Mouth contraction |
| Def | >0.005 | Mouth horizontal deformation |
|  | <−0.005 | Mouth vertical deformation |
| Curl | >0.005 | Mouth clockwise rotation |
|  | <−0.005 | Mouth counter clockwise rotation |
| c | <−0.0001 | Mouth curving upward ('U' like) |
|  | >0.0001 | Mouth curving downward |

The thresholding scheme used to derive mid-level predicates that describes the head motions is shown in Table 2. The threshold values in Table 2 are derived using empirical data. As noted above, the planar model of facial motion is primarily used to stabilize the head motion so that the relative motion of the features may be estimated. However, the motion of this plane also provides a qualitative description of the head motion as shown in Table 3. For example, feature motion detector 22 can qualitatively recover when the head is rotating or translating. True three dimensional motion of a head could be recovered using a model that is more general than the planar model used in Table 2. In an alternate embodiment, mid-level predicates for the face, mouth, eyes, and eyebrows could be determined by feature motion detector 22 using a combination of the threshold scheme shown in Tables 1 and 2 in combination with boolean logic to provide additional mid-level predicate descriptions. In addition, any number of mid-level predicates could be combined in a logical sequence to test for a specific facial formation. For example, the motion parameters estimated for the mouth region could be combined in a logic sequence to derive a mid-level predicate that detects when the left side of the mouth curves downward while the right side of the mouth curves upward.

TABLE 2

| Parameter | Threshold | Mid-Level Predicates |
|---|---|---|
| $a_0$ | >0.5 | Head rightward |
|  | <−0.5 | Head leftward |
| $a_0$ | <−0.5 | Head upward |
|  | >0.5 | Head downward |
| Div | >0.01 | Head expansion |
|  | <−0.01 | Head contraction |
| Def | >0.01 | Head horizontal deformation |
|  | <−0.01 | Head vertical deformation |
| Curl | >0.005 | Head clockwise rotation |
|  | <−0.005 | Head counter clockwise rotation |
| $p_0$ | <−0.00005 | Head rotating rightward around the neck |
|  | >0.00005 | Head rotating leftward around the neck |

TABLE 2-continued

| Parameter | Threshold | Mid-Level Predicates |
|---|---|---|
| $P_1$ | <−0.00005 | Head rotating forward |
| | >0.00005 | Head rotating backward |

G. Temporal Motion Representation

Figure 9:
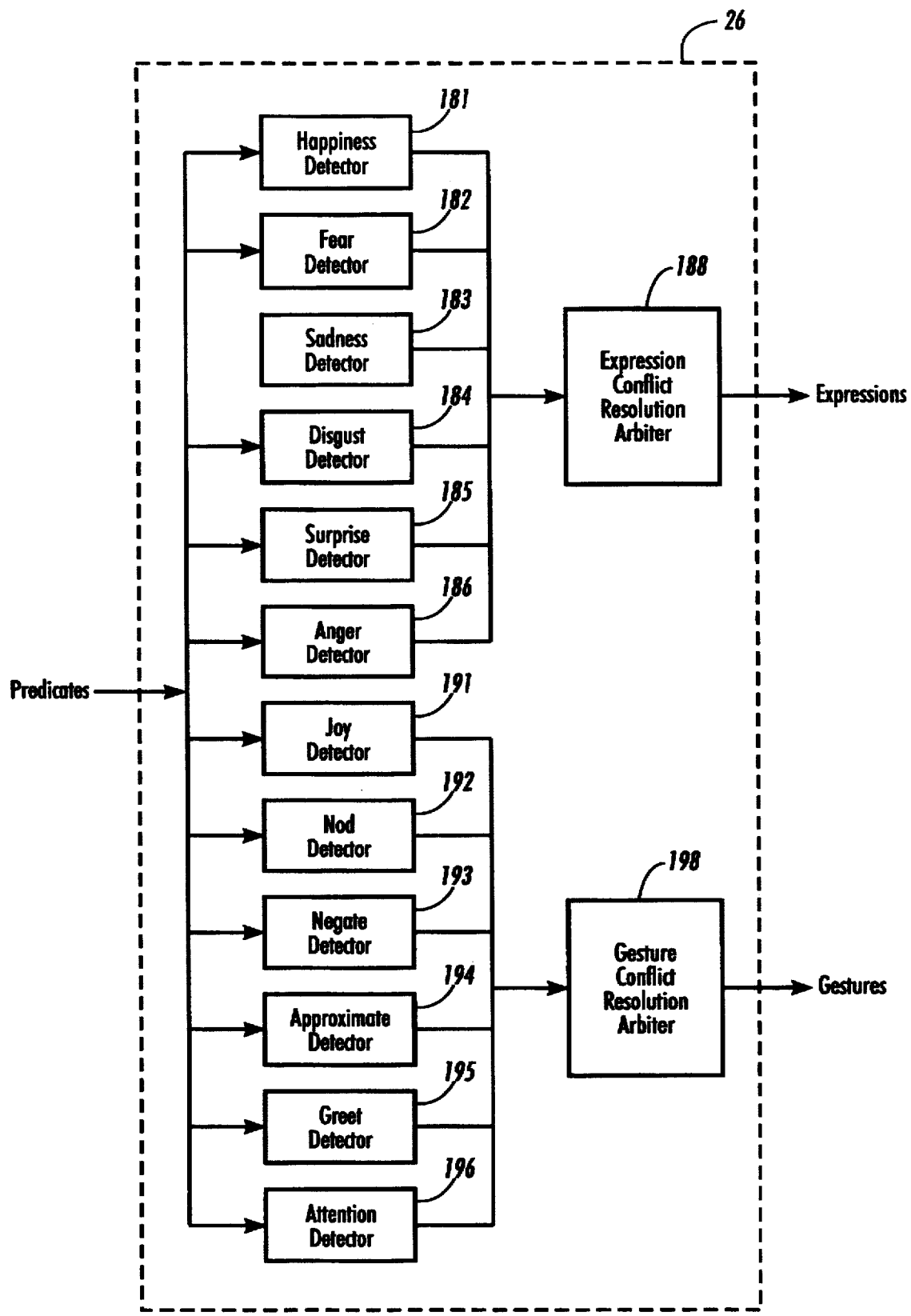
FIG. 9 is a detailed block diagram of the expression and gesture recognition detector shown in FIG. 1.

FIG. 9 is a detailed block diagram of the expression and gesture recognition detector 26 shown in FIG. 1 which receives as input mid-level predicates from feature motion detector 22 and transmits as output high-level representations of facial actions. Expression and gesture recognition detector 26 includes independent expression recognition detectors 181–186, independent gesture recognition detectors 191–196, expression conflict resolution arbiter 188, and independent gesture conflict resolution arbiter 198. Output from expression and gesture recognition detector 26 is input to application driver 30 for use by either passive or active applications connected thereto.

G.1 Determining Facial Expressions

Each detector 181–186 independently examines images acquired by sequence manager 10 for one of the six principle emotions that are universally associated with distinct facial expressions. These six principal emotions have been described and classified in the psychological literature by Ekman which is cited above. When determining the high-level representation of facial actions, recognition detector 26 considers the temporal consistency of the mid-level predicates to minimize the effects of noise and inaccuracies in the planar, affine, and affine with curvature motion and deformation models used to estimate motion between images by motion estimation system 16.

Figure 10:
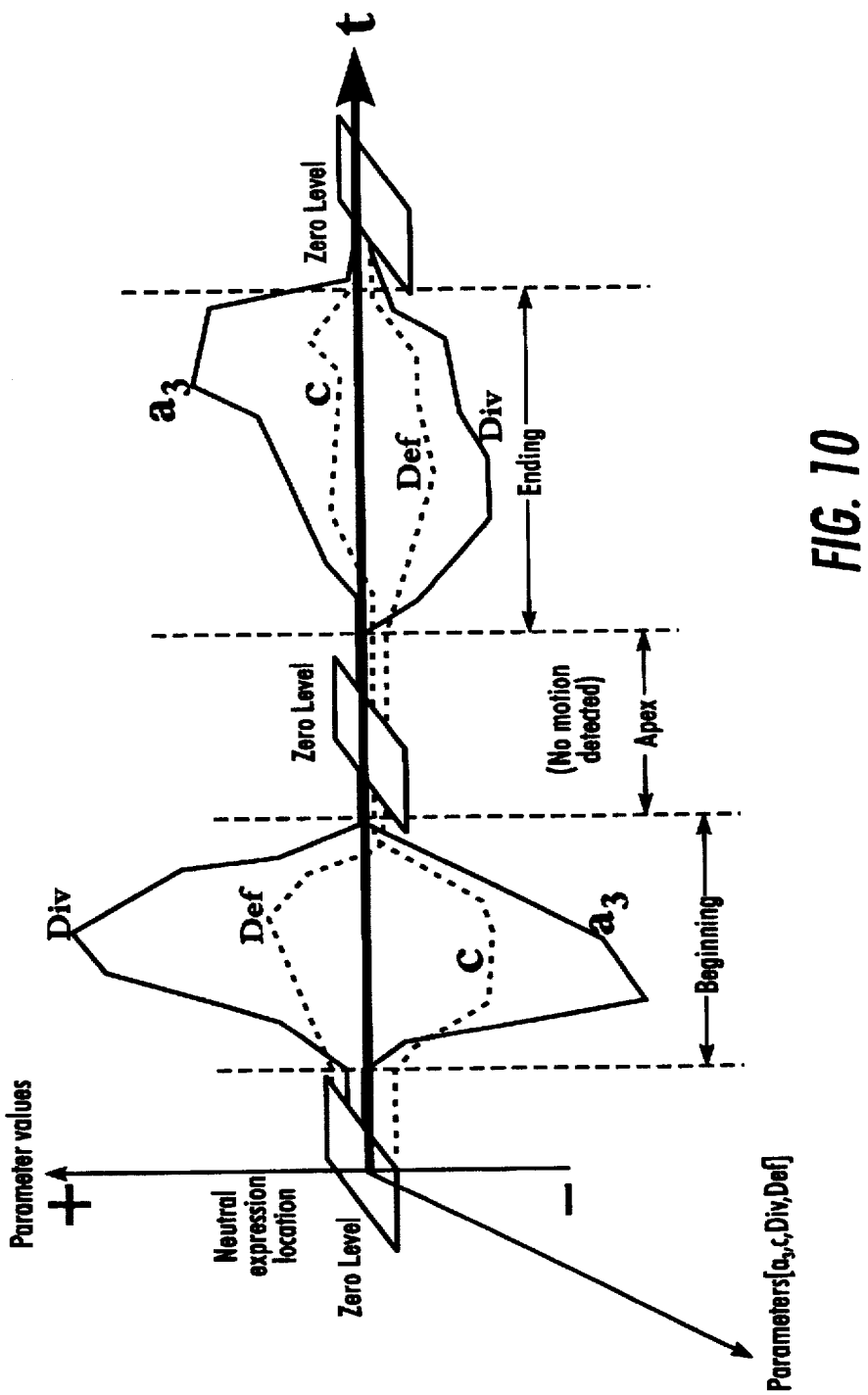
FIG. 10 illustrates a graph of three temporal segments of a model for a smile using parameters from motion and deformation models output by the motion estimation system show in FIG. 1.

Expression and gesture recognition detector 26 follows the temporal approach for recognition proposed by Yacoob et al. in "Computing Spatio-Temporal representations of Human Faces," Proc. Computer Vision and Pattern Recognition, CVPR094, pages 70–75, Seattle, Wash., June 1994, the pertinent portions of which are incorporated herein by reference. Specifically, each facial expression examined by detectors 181–186 is divided into three temporal segments: beginning, apex and ending. For example, FIG. 10 illustrates a graph of the segments of a temporal model stored in memory 28 for a smile using parameters from the affine with curvature motion and deformation models for the mouth region used by estimation system 16. The graph in FIG. 10 illustrates that changes in parameter values that indicate a single segment of the temporal model does not occur within a single image frame but rather over a plurality of image frames. For example, in order to evaluate the existence of a temporal segment of an expression requires that a detector (181–186) identify a significant overlap between parameters values over a set of image frames before identifying the set of image frames as satisfying a beginning, apex, or ending temporal segment.

A beginning temporal segment (or beginning of expression) indicates an onset of expression. Specifically, motion parameters indicating motion between image frames are motion parameters that indicate an onset of expression. Similarly, a ending segment (or ending of expression) indicates an ending of expression. Specifically, motion parameters indicating motion between frames are motion parameters that indicate an ending of expression, the movement of the onset and the ending of expression tends to be in opposite directions. Between the onset and ending temporal segments there exists an apex or peak segment, the peak segment is defined by a series of images with motion parameters that indicate an absence of motion (i.e. the motion parameters indicate that no motion is taking place with those features between those frames).

In one embodiment, expression and gesture recognition detector 26 evaluates the presence of expression using motion parameters output directly from motion estimation system 16 using a neural net or the like. By way of example, FIG. 10 illustrates a graph of how happiness detector evaluates the detailed development of a "smile" in an image sequence using the motion parameters output and derived by motion estimation system 16. First, happiness detector 181 detects the upward-outward motion of the mouth corners in a negative curvature of the mouth as represented by the curvature parameter c having a negative value. Subsequently, detector 181 detects the horizontal and overall vertical stretching of the mouth by positive divergence (i.e. Div parameter) value and deformation (i.e. Def parameter) value. Finally, detector 181 detects some overall upward translation caused by the raising of the lower and upper lips due to the stretching of the mouth (i.e. parameter $a_3$ is negative). Reversal of these motion parameters is observed by detector 181 during the ending of the "smile" expression.

For example, other expressions can have the following characterizations. The anger expression can be characterized by an initial pursing (or flattening) of the lips then by a long slow downward curvature, after which the mouth curves and deforms back to its relaxed position. In addition to the mouth, the eyes and brows can play a significant role in characterizing anger by moving together and down while becoming flatter (negative curvature) during the initiation of the expression. The nasal edges of the brows also dip downwards causing opposite curl for the two brows. These motions are reversed at the end of an anger expression. In another example, the surprise expression can be initiated by the mouth translating downward, diverging, and deforming significantly. Simultaneously, during a surprise expression the brows and eyes move upward, the brows arch, and the eyes deform as they widen. The ending phase of the surprise expression is a gradual return of the face to its relaxed position.

In the preferred embodiment, mid-level predicates output from motion detector 22 are evaluated by each expression detector 181–186 using rules set forth in Table 3. Specifically, Table 3 lists rules for detecting the beginning (B) and ending (E) temporal segments for the happiness detector 181, fear detector 182, sadness detector 183, disgust detector 184, surprise detector 185, and anger detector 186. The presence of a mid-level predicate that correspond to the beginning or ending of an expression are detected continuously by each detector 181–186 over a sequence of images. Detection of predicates must occur over at least four consecutive image frames for the mid-level predicate to be recognized by each detector 181–186 as either a beginning or ending of an expression (where the four consecutive images have a sampling rate of thirty frames a second).

TABLE 3

| Expression | B/E | Mid-Level Predicate Actions |
|---|---|---|
| Happiness | B | upward curving of mouth and expansion or horizontal deformation |
| Happiness | E | downward curving of mouth and contraction or horizontal deformation |
| Fear | B | expansion of mouth and raising-inwards inner parts of brows |
| Fear | E | contraction of mouth and lowering inner parts of brows |

TABLE 3-continued

| Expression | B/E | Mid-Level Predicate Actions |
|---|---|---|
| Sadness | B | downward curving of mouth and upward-inward motion in inner parts of brows |
| Sadness | E | upward curving of mouth and downward-outward motion in inner parts of brows |
| Disgust | B | mouth horizontal expansion and lowering of brows |
| Disgust | E | mouth contraction and raising of brows |
| Surprise | B | raising brows and vertical expansion of mouth |
| Surprise | E | lowering brows and vertical contraction of mouth |
| Anger | B | inward lowering of brows and mouth contraction |
| Anger | E | outward raising of brows and mouth expansion |

Since each of the expression detectors 181-186 operate on each image frame of a sequence of images independently, the detectors 181-186 when evaluated together may create conflicting hypotheses. To manage the possibility of conflicting hypotheses, expression conflict resolution arbiter 188 evaluates whether conflicts have arisen between detectors and resolves any conflicting expressions. Conflict arbiter 188 evaluates conflicts that may arise when an ending of an expression is mistaken as the beginning of a different expression. For example, the anger detector 186 may consider the lowering of the eyebrows as a beginning of an anger expression during the ending of a surprise expression detected by surprise detector 185. Conflict arbiter 188 resolves such conflicts by giving preference to expressions that began at an earlier point in time in a sequence of image frames.

Figure 11:
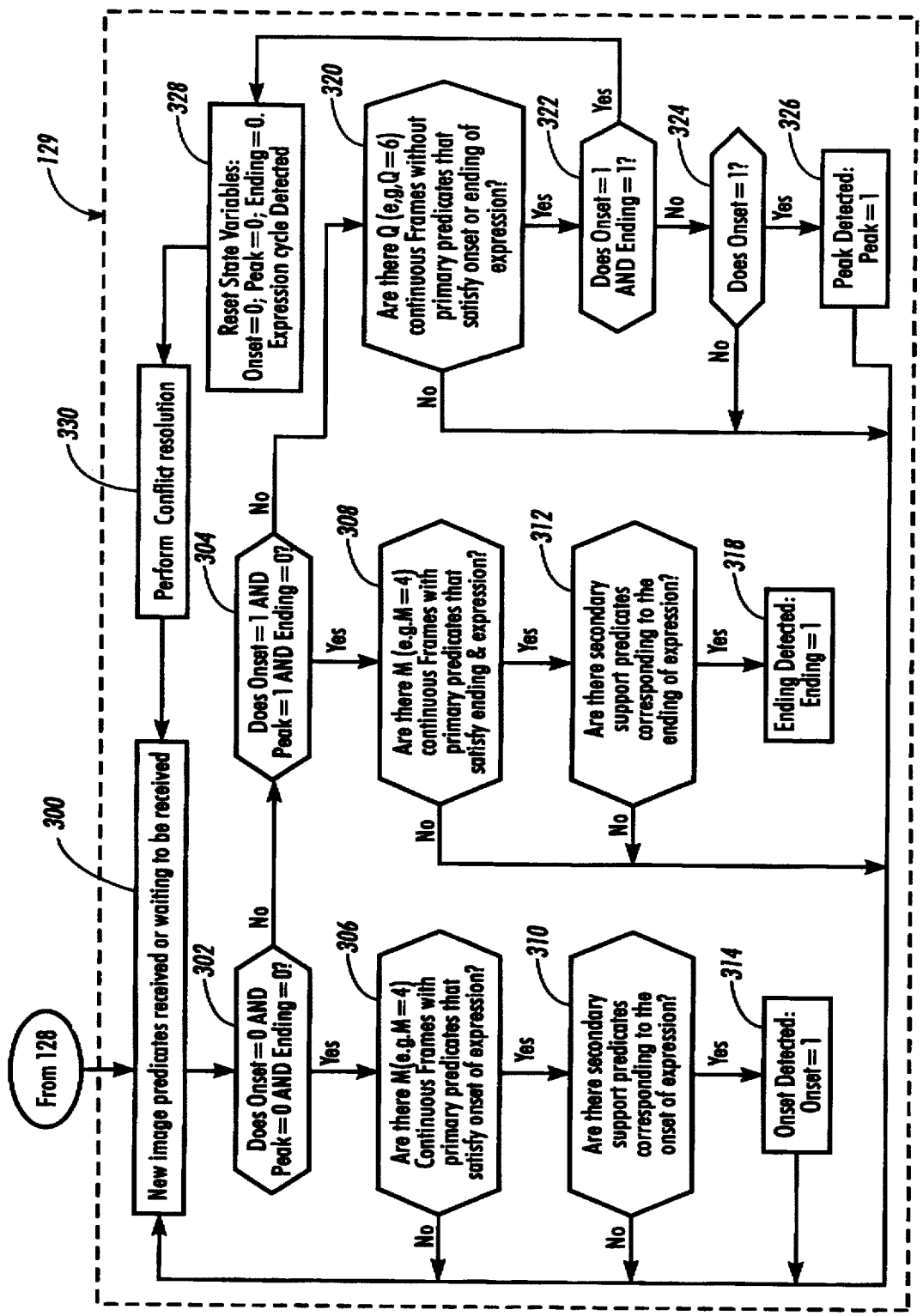
FIG. 11 is a flow chart showing the general steps performed by each expression recognition detector 181–186 shown in FIG. 9.

FIG. 11 is a flow chart showing the general steps performed by each detector 181-186 when independently evaluating mid-level predicates (shown for example in Tables 1 and 2) output by feature motion detector 22. At step 300, new mid-level predicates output from feature motion detector 22 at step 128 (shown in FIG. 6) that are associated with an image frame are received or waiting to be received. Assuming that initially each detector 181-186 has a set of state variables onset, peak, and ending that correspond to the detection of temporal segment beginning, apex, and ending, respectively. Initially, each state variable for each detector 181-186 is set to zero (e.g. onset=peak=ending=0).

At step 302, the state variables onset, peak, and ending are tested to detect whether a beginning temporal segment has not yet been detected (e.g. whether onset=peak=ending=0). If a beginning temporal segment has not been detected, each detector 181-186 tests whether M continuous image frames in which a primary mid-level predicate that satisfies the onset of an expression has been detected. A primary mid-level predicate is a mid-level predicate that is very rigid and tends to trigger an event. For example, a primary mid-level predicate for surprise detector 185 is a predicate that depicts raising of the eyebrows. A detector that does not detect at least four continuous image frames (e.g. M=4) with a primary mid-level predicate returns to step 300 to wait for a subsequent image frame with a new set of image predicates. On the other hand, if four continuous frames have been detected by a detector with a primary mid-level predicate, the detector executes step 310 to determine whether secondary support predicates exist that correspond to the onset of an expression. A secondary support predicate is a mid-level predicate signifying motion that supports the onset of an expression. For example, a secondary mid-level predicate for surprise may be given by a predicate that signifies curving or stretching of the eyebrows. Secondary support predicates may occur in only one part of a feature at a time. For example, an expression of surprise may result in the curving of a single eyebrow. A detector that does not detect at least four continuous image frames (e.g. M=4) with secondary support predicates at step 310, returns to step 300 to wait for a subsequent image frame.

At step 314, the onset variable is set to one (e.g. onset=1) to indicate both steps 306 and 310 are satisfied in that primary predicates and secondary support predicates have been detected by a detector in a sequence of at least four image frames. Assuming the onset image variable is set to one, the detector returns to step 300 to wait for a subsequent frame with corresponding mid-level predicates. When a subsequent frame arrives, step 302 tests negatively because the onset state variable was set to one at step 314. At step 304, the state variables onset, peak, and ending are tested to determine whether an onset and a peak have been detected. Given that no peak has been detected, step 320 is executed. At step 320, a detector tests whether six continuous frames (i.e. Q=6) have elapsed without primary predicates that satisfy onset or ending of expression. If the expression at step 320 tests negatively then the detector returns to step 300, otherwise step 322 is executed. If at step 322, the onset and ending variables are not set to one (i.e. beginning and ending temporal segments have not been detected), the detector tests at step 324 to determine whether a beginning segment has been detected (e.g. onset=1). When the onset state variable equals one at step 324, step 326 is executed by a corresponding detector. At step 326, the peak state variable is set to one to indicate that ten continuous frames have elapsed, namely at least four continuous frames have elapsed with primary predicates and secondary support predicates that correspond to the onset of expression, and subsequently six continuous frames have elapsed without primary predicates that satisfy an onset or ending of expression. After executing step 326, step 300 is repeated.

Assuming the onset and peak state variables have been set to one, step 304 tests positively and step 308 is subsequently executed. At step 308, the sequence of images with mid-level predicates is tested to determine whether four (e.g. M=4) continuous frames have elapsed with primary predicates that satisfy ending of expression. If step 308 tests negative, step 300 is executed again. If step 308 tests positive, the same sequence of images is tested to determine whether four (e.g. M=4) continuous frames have elapsed with secondary predicates that satisfy an ending expression. If step 312 tests negative, step 300 is executed again. If step 312 tests positive, step 318 is executed. At step 318, state variable "ending" is set to one, which indicates that at least fourteen continuous image frames have elapsed, namely at least four continuous frames have elapsed with primary predicates and secondary support predicates that correspond to the onset of expression, at least six continuous frames have elapsed without primary predicates that satisfy an onset or ending expression, and at least four continuous frame have elapsed with primary and secondary support predicates that correspond to the ending of expression.

If the state variables onset, peak, and ending all equal one and six (Q=6) continuous frames have elapsed without primary predicates that satisfy either the onset or ending of expression, steps 320 and 322 will test positive and step 328 is executed. At step 328, an expression cycle has been detected and the three state variables are reset to zero (e.g. onset=peak=ending=0). Once an expression cycle is detected expression conflict resolution is performed at step 330, the details of which are shown in FIG. 12.

Figure 12:
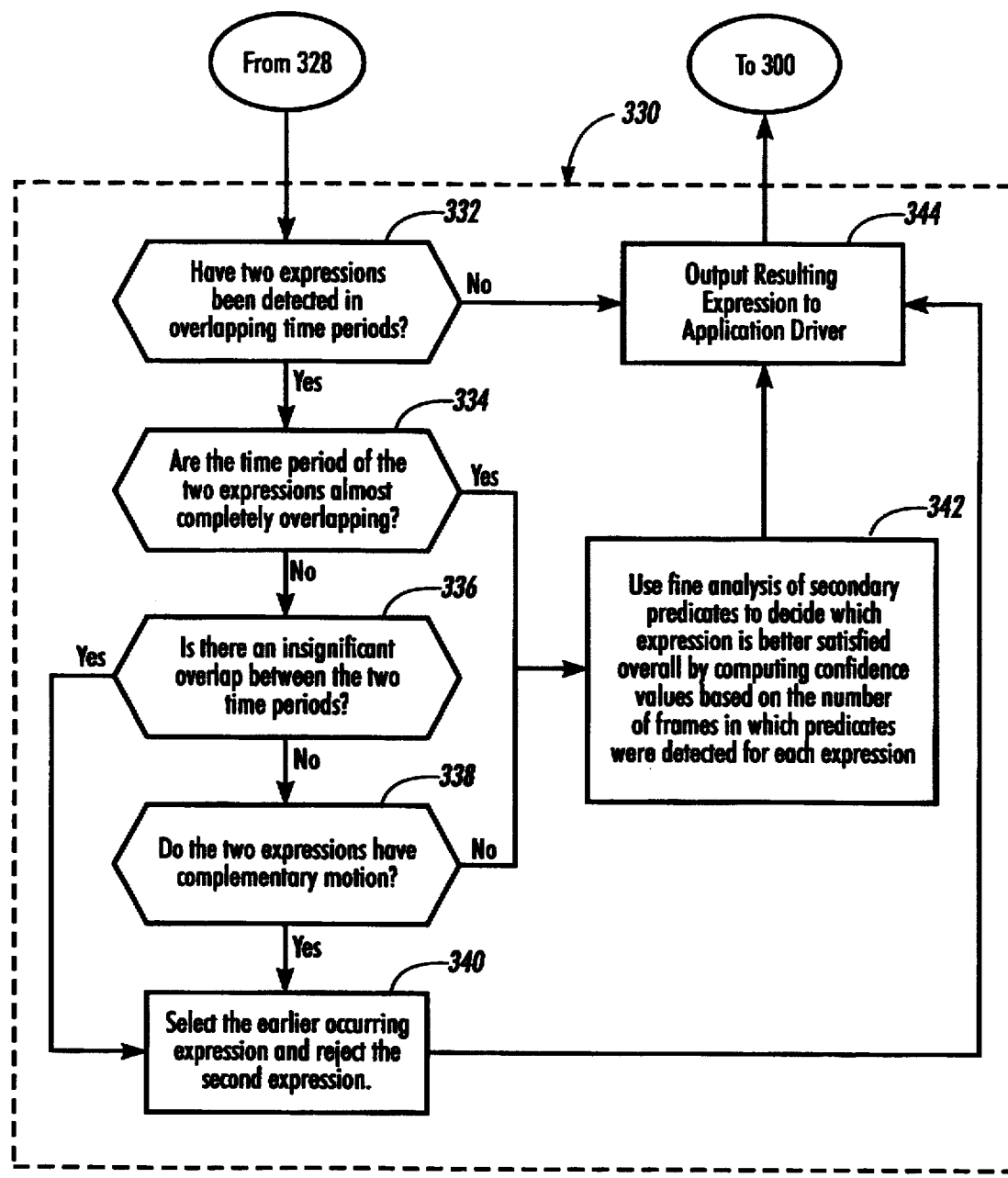
FIG. 12 is a flow chart showing the general steps performed by the expression conflict resolution arbiter shown in FIG. 9.

FIG. 12 is a flow chart showing the general steps performed by expression conflict resolution arbiter 188. Initially at step 322, arbiter 188 determines whether conflicts have arisen between detectors 181-186. Specifically, at step 322 arbiter 188 determines whether two expressions have been detected by detectors 181–186 in overlapping time periods. If an expression has been detected by one of the detectors 181–186 and the detected expression has no overlapping time period with any other expressions detected (or that is being detected) by another detector, arbiter 188 has finished its analysis and outputs the currently detected expression to application driver 30 at step 344. Subsequent to step 344, analysis of incoming mid-level predicates of a sequence of images continues at step 300.

At step 334, two expressions which have been detected in overlapping time periods are tested to determine whether their overlapping time periods are almost completely overlapping. Time periods which are almost completely overlapping (or strongly overlapping) are defined herein as time periods that overlap for more than 80% of the frames defining each expression, and the beginning and ending of each expression are within 15 frames of each other respectively. For example, if a first expression is detected between frames 100 and 150 and a second expression is detected between frames 98 and 140, arbiter 188 determines such an overlap to be almost completely overlapping or strongly overlapping. In the case that two expressions have strongly overlap ping time periods, fine analysis of secondary predicates is used by arbiter 188, at step 342, to determine which detected expression to select as a resulting expression. Specifically, at step 342 arbiter 188 defines a preferred expression as one which has greater confidence values. Confidence values for each expression are measured based on the number of frames in which secondary predicates are detected over the interval of image frames in which an expression is detected. For example, fear & surprise, and anger & disgust are two pairs of emotions which have a tendency to yield conflicting results which are strongly overlapped. Confidence values measured for fear & surprise are the secondary predicates for fear (e.g. stretching inward of the eyebrows) and for surprise (e.g. raising and stretching upwards of the eyebrows). Once, arbiter 188 at step 342 determines a resulting expression based on the frequency that secondary predicates occurred for a set of conflicting expressions, the resulting expression is output to application driver 30 at step 344.

At step 336, time periods of two expressions which have been found not be strongly overlapping are tested to determine whether an insignificant overlap between the two time periods exists. An insignificant overlap is defined as an overlap between two expressions where the beginning of a first expression occurs more than 15 frames before or after the beginning of a second expression. If an insignificant time period is detected, the earlier occurring expression is determined to be the resulting expression at step 340. If an insignificant overlap is not detected at step 336, the two expressions are tested to determine whether the two conflicting expressions have complementary motions at step 338. If complementary motions between two conflicting expressions are detected at step 338, arbiter 188 executes step 340 otherwise step 342 is executed, both of which are described above. When step 340 is executed because two expressions have complementary motions, the first expression becomes the resulting expression since the second expression usually involves the reverse action of the first expression. As noted above, once a resulting expression is selected by arbiter 188, the expression is output to application driver 30 at step 344.

G.2 Determining Gestures

With reference again to FIG. 9, each detector 191–196 independently examines images acquired by sequence manager 10 for one of six principle head gestures. These six principal gestures have been described and classified in the psychological literature by: Bull, in "Posture and Gesture," Pergamon Press, 1987; and Saitz et al., in "Handbook of Gestures: Columbia and the United States," Mouton & Co., The Hague, Netherlands, 1972. Specifically, detector 191 detects gestures expressing joy; detector 192 detects gestures expressing agreement (e.g. nodding); detector 193 detects gestures expressing disagreement (i.e. negating); detector 194 detects gestures characterizing approximation (e.g. 'more-or-less' and 'maybe'); detector 195 detects greetings; and detector 196 detects gestures characterizing shifting attention. Gesture conflict resolution arbiter 198 detects and resolves conflicts between detectors 191–196.

The planar motion models described above are used to qualitatively analyze head motions. Table 4 provides a description of the motions associated with each gesture detected by detectors 191–196. The rotational parameters computed for image-yaw, image-pitch, and image-curl are used to define three primary rotational parameters for the head. Detector 192 detects a nodding gesture by detecting cyclic changes in image-pitch. Detector 193 detects a negating gesture by detecting cyclic changes in image-yaw. Detector 194 detects an approximating gesture by detecting cyclic changes in image-curl. In detecting each of these three gestures (i.e. nodding, negating, and approximating), detectors 192–194 must detect a minimum of two cycles of the head motion defining each gesture before indicating that a gesture has been detected. In other words, for each of these gestures, motion defining each gesture must repeat for at least two periods before a gesture is detected. While detecting each of these gestures a non-zero component of rotation may be estimated by each detector in directions other than expected due to approximating the head as an independent rigid body (which is inaccurate due to the constraints imposed by the neck on the head motion), and due to errors in the planar face model.

Detector 195 detects a greeting gesture by detecting a single cycle of a nodding sequence. Specifically, a greeting gesture is typically detected by a relatively slow cyclic change in image-pitch. Detector 196 detects a shift attention gesture by detecting simultaneous rotations in both image-yaw and image-pitch that are subsequently reversed. Detector 191 detects an expression of joy by detecting significant rotations in both the image plane (i.e. image-curl) and around the neck (i.e. image-yaw and possibly image-pitch). A minimum of two cycles is required to detect an expression of joy.

TABLE 4

| Gesture | Observed Head Motion |
| --- | --- |
| Nod | Cyclic rotations in image-pitch (a minimum of two cycles is required) |
| Negate | Cyclic rotation is image-yaw (a minimum of two cycles is required) |
| Approximate | Cyclic rotations image-curl (a minimum of two cycles is required; no other rotations should occur) |
| Greet | A single rotation cycle in image-pitch |
| Shift Attention | A single rotation cycle in image-yaw and in image-pitch (relatively long pause before reversal of action) |
| Express joy | Cyclic rotations in image-curl (minimum of two cycles is required; other rotations image-pitch and image-yaw must occur) |

Figure 13:
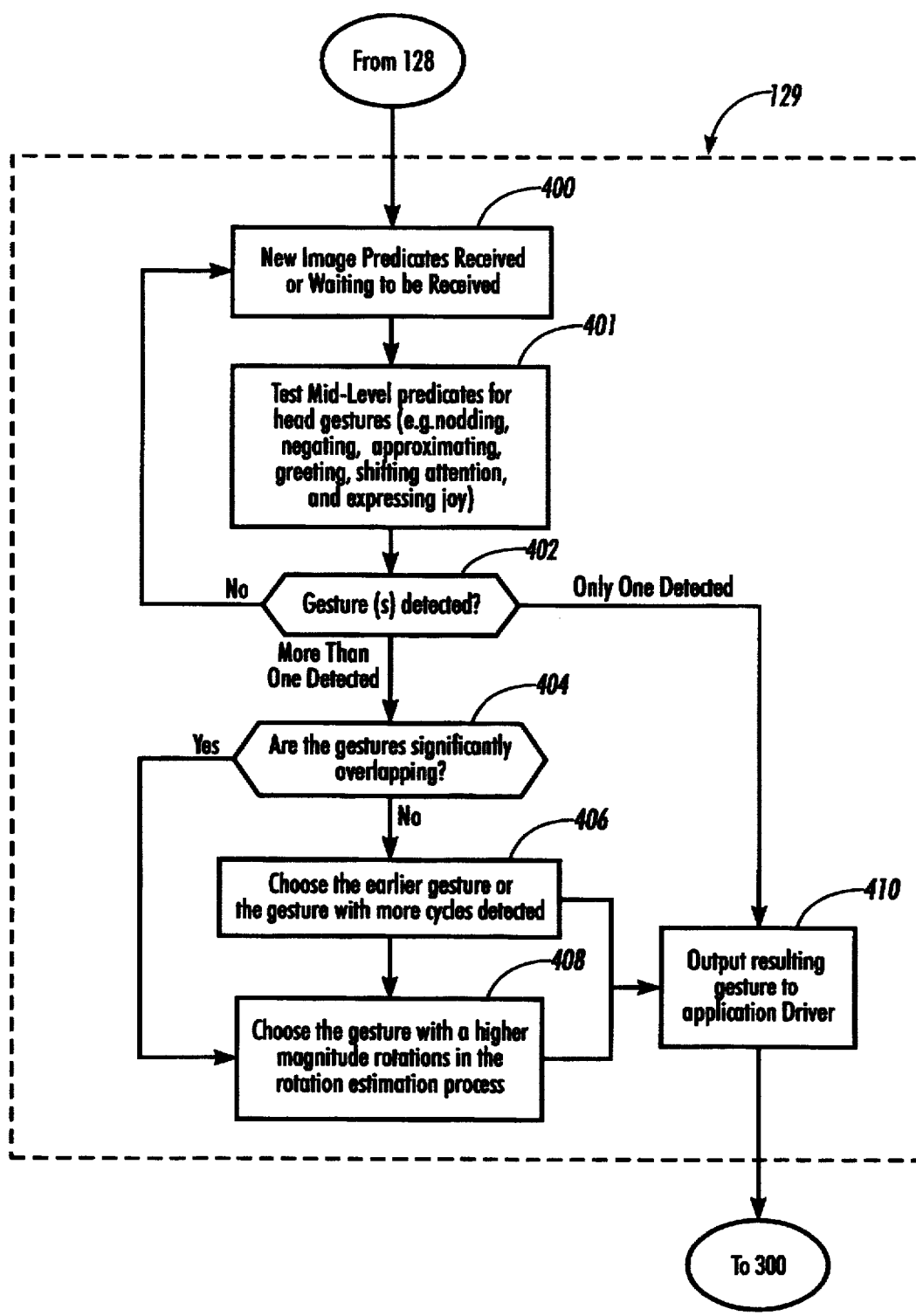
FIG. 13 is a flow chart showing the general steps performed by the gesture conflict resolution arbiter shown in FIG. 9.

FIG. 13 is a flow chart outlining the general steps performed by detectors 191–196 and arbiter 198. At step 400, new mid-level predicates output from feature motion detector 22 (at step 128 shown in FIG. 6) that are associated with an image frame are received or waiting to be received. Once an image frame has been received step 401 is executed. At step 401, each detector 191–196 tests for the presence of each head gesture listed in Table 4 in accordance with the state diagram shown in FIG. 14, which is described in detail later. If a gesture is not detected at step 402, then step 400 is executed again. Otherwise, if a gesture is detected at step 402 arbiter 198 tests at step 402 whether two gestures have been detected. If only one gesture has been detected, at step 402, then the detected gesture is output to application driver 30 at step 410. If more than one gesture has been detected at step 402, step 404 is executed which tests for significantly overlapping gestures. If the gestures are significantly overlapping then more than 80% of the frames defining each gesture overlap and start within 15 frames of each other. At step 408, arbiter 198 selects between gestures which significantly overlap by choosing the gesture having a higher magnitude of rotation. Magnitude of rotation is defined by the magnitude of a motion parameter used to define a mid-level predicate (e.g. head rotating forward). Alternatively, if gestures do not significantly overlap step 406 is executed. At step 406, an earlier gesture or a gesture having a greater number of cycles is selected as the resulting gesture. The resulting gesture selected at either step 408 or 406 is output at step 410 to application driver 30.

Figure 14:
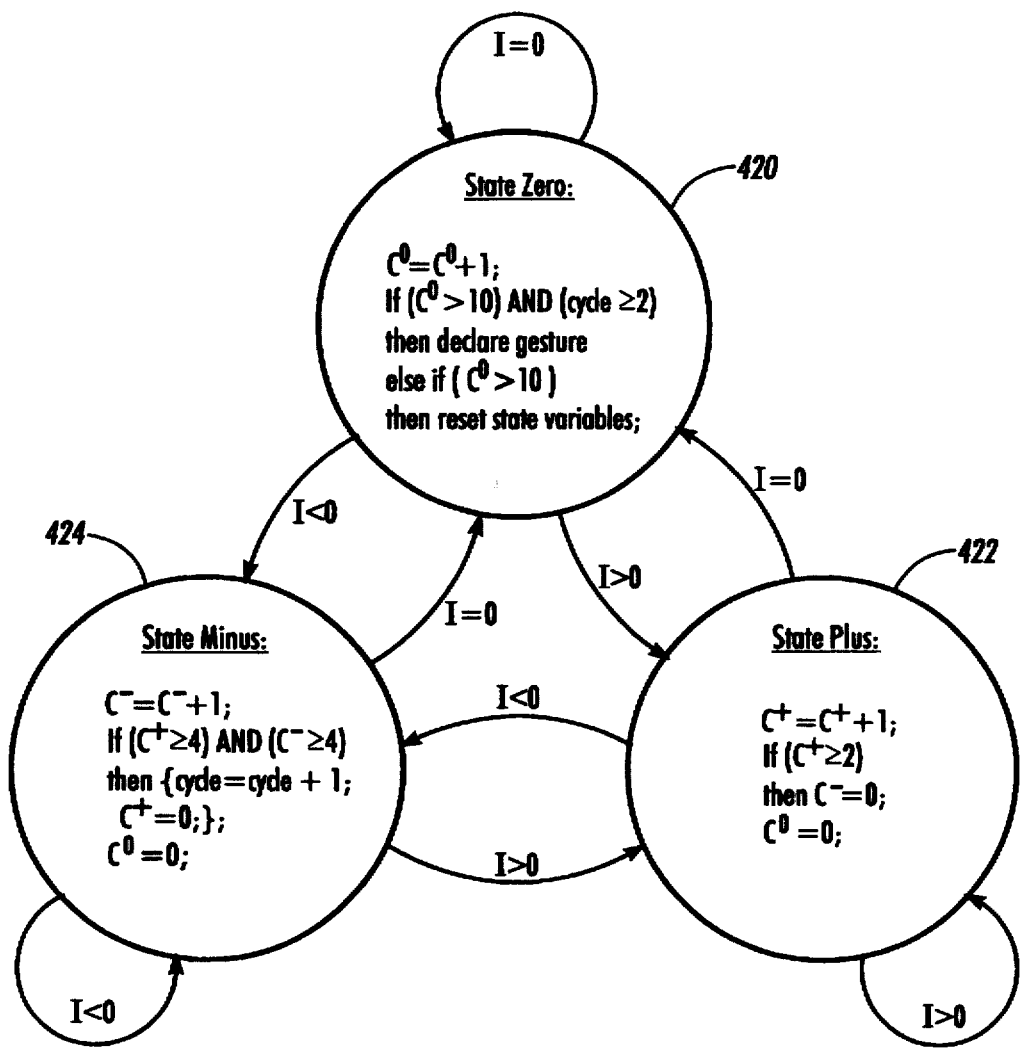
FIG. 14 is a state diagram illustrating state transitions between image frames performed by each gesture recognition detector 191–196 shown in FIG. 9.

FIG. 14 is a state diagram illustrating step 401 in greater detail. Generally, the state diagram shown in FIG. 14 represent the method used by detectors 191–196 to detect the gestures enumerated in Table 4. The state diagram in FIG. 14 has states zero, plus, and minus, as indicated generally by reference numbers 420, 422, and 424, respectively. Assuming a head is initially in a neutral position, the state diagram shown in FIG. 14 will be in 'State Zero'. A detector operating in accordance with the state diagram will test predetermined mid-level predicate values for changes in value. For example, detector 192 will test for nodding by testing the mid-level predicate for forward head rotation, which is shown in Table 2 and represented by parameter $p_1$. A mid-level predicate is indicate generally in the state diagram by the letter "I". The predicates are tested at each frame in a sequence of images.

If "I" or the predicate value of a predicate is greater than zero or increasing (i.e. I>0) then a state transition takes place to 'State Plus'. For example, if detector 192 were detecting nodding counter for the plus state (i.e. $C^+$) is incremented by one (e.g. $C^+=C^++1$). If the counter $C^+$ had already been incremented to two then the counter for the minus state (e.g. $C^-$) is set to zero (e.g. $C^-=0$) in order that any backwards motion is canceled at the start of a new cycle. Subsequently, the counter for the zero state (e.g. $C^0$) is set to zero (e.g. $C^0=0$).

If "I" or the predicate value of a predicate is less than zero or decreasing (i.e. I<0) then a state transition takes place to 'State Minus'. For example, once detector 192 detects a decreasing predicate value for nodding then counter $C^-$ is incremented by one. In addition, the counter $C^-$ and the counter $C^+$ are tested to determine if each counter has been incremented consecutively for four frames and if they have been a 'cycle' counter is incremented (e.g. if ($C^+ \geq 4$) AND ($C^- \geq 4$) then cycle=cycle+1). Subsequently, the counter for the zero state (e.g. $C^0$) is set to zero (e.g. $C^0=0$).

If "I" or the predicate value of a predicate is zero or not changing (i.e. I=0) then a state transition takes place to 'State Zero'. For example, once detector 192 detects a predicate value has not changed for nodding then counter $C^0$ is incremented by one. In addition, if the counter $C^0$ has been incremented for ten consecutive frames and two complete cycles have been detected, then a gesture is declared and passed onto arbiter 198 (i.e. if ($C^0>10$) AND (cycle$\geq 2$) then declare gesture). Otherwise, if counter $C^0$ has been incremented for ten consecutive frames then all the state variables are rest to zero (i.e. if ($C^0>10$) then $C^0=C^-=C^+=$cycle$=0$).

Although the state diagram shown in FIG. 14 has been used to describe a method for detecting nodding, it will be understood by those skilled in the art that the state diagram can be used to detect other gestures. It will also be generally understood that the state diagram can be implemented in reverse to achieve the same result but in the opposite direction. In the preferred embodiment gestures are detected by executing the state diagram in either direction. For example, nodding can begin by either rotating forward or rotating backwards. The state diagram shown in FIG. 14 can be used to detect cyclical forward rotations. To detect repeating cyclical backwards rotations the 'State Minus' and 'State Plus' need to be reversed.

H. Invoking Applications Using Application Driver

Application driver 30 receives input to operate machines (not shown) which are connected thereto. Output received by motion estimation system 16, region tracking system 18, feature motion detector 22, or expression and gesture recognition detector 26 is mapped by application driver 30 to particular machine functions of the connected machines. Application driver 30 can map either motion parameters output by motion estimation system 16, discrete gestures output by feature motion detector 22, positions of segmented regions in an image output by region tracking system 18, and continuous motion representation or high-level representations of facial actions output by expression and gesture recognition detector 26. Examples of machines and applications that can be invoked by application driver 30 are described below.

H.1 Passive Human-Computer Applications

The facial expression recognition system 4 can be used to implement a system that responds to passive human-computer interactions. Specifically, system 4 can enable computer software operating on a basic computer workstation (not shown) or the like to more effectively interact with humans by observing a computer user's emotional state. In this context, application driver 40 is given a mapping from a user's emotion state recorded by image acquisition system 8 (e.g. a camera) and interpreted by expression recognition system 26, to certain adjustments in the software operating on the basic computer workstation. These software adjustments sensitize the behavior of the software to predefined human interactions. In sum, the system tracks the face of a user while using the computer system, monitors a user for instances of activities from categories that affect software behavior, and alters the presentation of the operating software on the screen.

In addition, passive human-computer interactions can be used to evaluate human performance. For example, system 4 would recognize whether a student is paying attention, bored, happy, etc. This information would then be used by the educational software to automatically tailor the presentation of the material to each students attention level and interests. Also, system 4 can be used with a voice recognition system to detect whether a user is talking to a computer. For example, system 4 would be used to track the face of the user and determine whether the user's face is rotated towards the computer and whether the user's lips are moving. System 4 can also make voice commands of a user sensitive to the location of the user relative to the user's computer. For example, comments made when a user is talking on the phone or is away from the computer will not have an effect, yet the same comments when directed at the computer invoke a predefined command.

System 4 can also be used to track head and eye motions of a user operating a computer in order that the computer detect where on the screen the user is looking. This head and eye tracking information output by region tracking system 18 can be used by application driver 30 to move from one window to another in the computer's operating environment. Thus, rather than requiring a computer user to position a mouse within a window, the present invention enables a user's attention to determine what window is currently being operated upon.

H.2 Active Human-Computer Applications

Alternatively, system 4 can detect human expression for use with active human-computer interaction. In active human-computer interaction scenarios, specific meanings can be assigned to continuous facial motions or discrete facial expressions. Specifically, facial actions are interpreted by system 4 as gestures with specific meanings such as nodding in agreement. Application driver 30 can be set up to be application dependent and user specific in order to control software programs or physical devices. For example, system 4 can enable interactive graphics. Temporal changes in the pose of a face with regard to its position and orientation in front of a computer can be interpreted by application driver 30 to invoke rotations, zooming, and translations of graphic objects on the screen of a computer. Such temporal changes could give a computer user the illusion of three dimensions. For example, as a user's head moves the user's view of a graphics object changes.

Generally, continuous motions of a face and features can be interpreted by system 4 to control a physical device. For example, in a noisy industrial environment where a worker's hands are busy and voice recognition may be unreliable, simple human facial gestures such as raising the eyebrows or opening the mouth could be interpreted by system 4 to invoke commands such as turning a device on or off. For example, in medical operating rooms, staff often are required to adjust lighting conditions based on areas focused on by a surgeon. Region tracking system 18 in combination with application driver 30 can be used to make automatic adjustment based on tracking the face and the eyes of the surgeon using a camera that inputs a sequence of images to acquisition system 8. Alternatively, head and facial feature motions can be mapped by application driver 30 to correspond to specific motions of a wheelchair. Turning the head left or right for instance can be mapped to wheelchair directional controls, while tilting the head forward or back can be mapped to wheelchair speed controls.

Other active human-computer applications include responding to questions elicited by computers. Since it is natural for people to respond to questions using a nodding or shaking head gesture to indicate agreement or disagreement respectively, an automated teller machine (ATM) with a built in camera (e.g. image acquisition system 8) can produce video sequences that can be interpreted by system 4 to discern non-verbal responses to ATM prompts. Alternatively, if video-phones were more widely available, similar interfaces could allow a person to navigate through an automated answering system as is done now by pushing buttons in response to questions, or by speaking simple commands.

H.3 Passive Applications that Monitor Human Behavior

Image acquisition system 8 can be used to capture passive observation of human facial expressions, attention, and gaze. These expressions can be detected by system 4 in captured images to monitor and analyze patterns of behavior and report on behaviors of interest. For example, a passive observation system can be used to analyze the use of various devices such as photocopiers or graphical user interfaces in order to determine where operators of such devices look, as well as, what expressions are made when operating such devices. In another example, a passive observation system could be mounted on shelves in a supermarket to evaluate customer responses. The passive observation system would track the customer faces over a period in which they search for products on a shelf. The present invention would be used to interpret captured images and report customer expressions recorded over the period spent inspecting the shelf.

Passive observation systems could be used in many other situations to gauge consumer interest in a variety of products or advertisements. Television ratings represents an immediate application for such a system. Ratings companies currently rely on questionnaires to determine who in a family watches what television shows. Family members could be identified automatically using a camera on top of a television. This type of system would make recording statistics more accurate and more efficient. Furthermore, if ratings companies could automatically determine the attention level of the viewers, this would provide a new dimension to their statistics. For example one would like to know who is actively watching the screen, who is smiling, who is laughing, who is crying, etc. System 4 would analyze a sequence of images of sampled television views. Output from system 4 would provide detailed feedback to networks and producers about their products.

H.4 Other Specific Applications

System 4 could be used in video-compression to achieve extremely low bit-rate coding of human faces for video compression. For example, one image of the face would be sent along with the motion parameters that describe facial motion. The sequence of images would be reconstructed using the image and the motion parameters output by system 4. This can be thought of as "model-based" compression of the variety envisioned for MPEG-4.

Alternatively, system 4 could be used with video-indexing applications that index into video data in which humans are present. Such indexing requires temporal analysis of human activity. System 4 would recognize the facial expressions of subjects to allow face-expression-based indexing into such data. For example, a query for "smiles" could be made in such a database. Alternatively, a user could smile for a camera and use the motion representation to index into a video database.

Motion estimation system 16 could be used with lip reading applications. The motion information recovered using the parameterized model for the mouth can be used to augment speech recognition systems. The affine with curvature model may not be sufficient, but it is possible that a simple parameterized model of mouth motion could be rich enough to aid in speech recognition. Additionally, unlike current systems that attempt this, the proposed system could cope with the natural motion of a human head while recovering motion of the mouth.

Animation, virtual reality, and games can be based on actions of real-people using system 4. The motion representation of the face and facial features recovered by motion estimation system 15 over a sequence of images can be output by application driver 30 and be used to animate three dimensional models and cartoons so that the spatial and temporal patterns of particular human actions are captured by an animation of similar movement. For example, video games and virtual reality systems may eventually rely on realistic human motion of synthetic human-like characters.

Traditional animation of such motion is not practical and current game makers rely on expensive "motion capture" technology which requires that actors be wired with sensors to capture their motion. This motion is then used to animate computer graphics models. The vision-based capture of human facial motion by system 4 adds new dimensions to this problem. First, current motion capture technology does not address facial motion. Facial motion however is crucial in order to make realistic animation of human action. Second, such a system does not require special sensors attached to an actor. In addition, current virtual reality systems require a magnetic head positioning system to determine a user's head position and gaze. Vision-based head tracking using system 4 could replace such a system.

The motion estimation system 4 can also be used to improve automobile safety by detecting when a driver may be falling asleep. System 4 would track head and eye motions and an application connected thereto would detect when a driver may be falling asleep and sound an alarm.

Teleconferencing, video-phone, or media-space applications typically have a camera looking at a user and the user is looking at one or more other video streams on a monitor. By observing the user's focus of attention, the interaction with the video streams could be context sensitive. For example, a voice channel is only opened to a particular video stream when the user looks at the window displaying the video stream. Another video conferencing application would add an active camera to the system. As a person moves around a space, the motion information could be used to control the active camera to keep the person's face roughly centered in the field of view and at a particular size. Such an "automatic camera" system would allow people to move more freely in front of a video conferencing system and hence behave more naturally. In an extreme example, users could move around an office equipped with multiple cameras all of which are tracking the user. An application connected to system 4 would choose the "best" image at a given moment. The automatic camera system could also be used with a room full of people. The faces and features of each person in the room could be tracked by one or more cameras. An application attached to system 4 would decide who was speaking at a given moment and transmit their image to the viewer(s) of the video conference. If multiple speakers were identified simultaneously, a group view could be transmitted. The same system could be used for meeting capture applications to aid in speaker identification.

Attention-dependent processing can be performed by tracking a user's attention using system 4. An application connected to system 4 would manage the display of computationally expensive information by automatically adapting to a user's current interest without degrading their perceptual experience. For example, consider a complex visual display screen with multiple regions containing graphics or video. When a user attention is directed at a particular area of the screen, computational resources are used to give the highest fidelity possible in that region. In the other regions of the screen which fall in the periphery of the user's visual field lower resolution or refresh rates might be used to reduce the computational load of the system. For a given amount of computational resources, the user would perceive increased performance over a static, non-attentive, system.

I. Overview

It will no doubt be appreciated that there are a number of possible manners in which to implement the facial expression recognition system. What is required by this invention is a motion estimation system which determines motion parameters for optical flow models. It will be readily understood by those skilled in the art than any number of different image flow models could be used to model the face. In determining values for the motion parameters any number of estimation techniques can be used besides a robust estimation technique. Other techniques include least squares regression analysis and correlation matching techniques. It is also understood that the present invention can be used to track other objects besides a human face. For example, the present invention could be modified to detect expressions of animals. Alternatively, the present invention could be used to track other types of non-rigid object that are proximate to or within a rigid object. For example, the present invention could be used to track non-rigid humans in a rigid car through a sequence of images. An advantage of the invention is that the parametric flow models not only accurately model non-rigid facial motions but also provide a concise description of non-rigid motion in terms of a small number of parameters. This aspect of the present invention provides tracking of a non-rigid object between two frames by eliminating the relative motion of articulated human motions (e.g. walking, sitting, jumping, etc.).

The disclosed facial expression recognition system may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A method for estimating movements of a face and a facial feature of a human appearing in a sequence of images recorded over time, comprising the steps of:

(a) acquiring with a processor a first image and a second image from the sequence of images, the first image being recorded at a first instant in time and the second image being recorded at a second instant in time;

(b) locating with the processor a first region of the first image in which the face is located and a second region of the first image in which the facial feature is located;

(c) computing with the processor a first transformation to estimate a movement of the face between the first region in the first image and a first region in the second image;

(d) forming a third image using the processor by warping the second image with the first transformation, said forming step eliminating, in the third image, the movement of the face between the first region in the first image and the first region in the second image so as to isolate, in the third image, a movement of the facial feature between the second region in the first image and a second region in the second image;

(e) computing with the processor a second transformation to estimate a movement of the facial feature between the second region in the first image and a region in the third image; and (f) combining with the processor the first transformation and the second transformation to estimate the movement of the facial feature between the second region in the first image and the second region in the second image.

2. A system for estimating movements of a first object and a second object appearing in a sequence of images recorded over time, comprising:

a sequence manager for acquiring with a processor a first image and a second image from the sequence of images, the first image being recorded at a first instant in time and the second image being recorded at a second instant in time;

an image segmentation system for locating with the processor a first region of the first image in which the first object is located and a second region of the first image in which the second object is located; and a motion estimation system including:
first means for computing with the processor a first transformation that estimates a movement of the first object between the first region in the first image and a first region in the second image; and second means for computing with the processor a second transformation that estimates a movement of the second object relative to the movement of the first object between the first image and the second image with the first transformation, wherein said second means for computing comprises:
means for forming a third image using the processor by warping the second image with the first transformation, said forming means eliminating, in the third image, the movement of the first object between the first region in the first image and the first region in the second image so as to isolate, in the third image, a movement of the second object between the second region in the first image and a second region in the second image; and means for combining with the processor the first transformation and the second transformation to estimate the movement of the second object between the second region in the first image and the second region in the second image.

3. A method for estimating movements of a first object and a second object appearing in a sequence of images recorded over time, comprising the steps of:

(a) acquiring with a processor a first image and a second image from the sequence of images, the first image being recorded at a first instant in time and the second image being recorded at a second instant in time;

(b) locating with the processor a first region of the first image in which the first object is located and a second region of the first image in which the second object is located;

(c) computing with the processor a first transformation that estimates a movement of the first object between the first region in the first image and a first region in the second image;

(d) computing with the processor a second transformation that estimates a movement of the second object relative to the movement of the first object between the first image and the second image with the first transformation, wherein step (d) comprises the steps of:
forming a third image using the processor by warping the second image with the first transformation, said forming step eliminating, in the third image, the movement of the first object between the first region in the first image and the first region in the second image so as to isolate, in the third image, a movement of the second object between the second region in the first image and a second region in the second image;

computing with the processor a second transformation to estimate a movement of the second object between the second region in the first image and a region in the third image; and combining with the processor the first transformation and the second transformation to estimate the movement of the second object between the second region in the first image and the second region in the second image.

4. A method according to claim 3, further comprising the step of computing with the processor an inverse transformation of the first transformation.

5. A method according to claim 4, wherein said step (c) warps the second image with the inverse transformation of the first transformation.

6. A method according to claim 5, wherein said acquiring step acquires a sequence of images representing a human face having a mouth, two eyes, and two eyebrows.

7. A method according to claim 6, wherein said locating step locates the face in the first region of the first image.

8. A method according to claim 7, wherein said locating step locates the mouth of the face in the second region of the first image.

9. A method according to claim 3, wherein said locating step locates the second region of the first image inside the first region of the first image.

10. A method according to claim 3, with the first region having a polygonal shape and the first image having a polygonal shape, further comprising the step of rotating with the processor the first region of the first image by an angle θ so that an edge of the first region is vertically aligned to an edge of the first image.

11. A method according to claim 8, further comprising the step of rotating with the processor the first image by the angle θ.

12. A method according to claim 8, further comprising the step of rotating with the processor the second image by the angle θ.

13. A method according to claim 3, wherein said step (c) estimates motion parameters of a planar flow model.

14. A method according to claim 3, wherein said step (d) estimates motion parameters of an affine flow model.

15. A method according to claim 3, further comprising the step of tracking with the processor the first region and the second region in the second image, said tracking step updating location and shape information of the first region and the second region in the second image.

16. A method according to claim 15, further comprising the step of acquiring with the processor a third image from the sequence of images.

17. A method according to claim 16, further comprising the steps of:

evaluating whether the first region and the second region in the second image are within confidence measurements; and responsive to said evaluating step indicating that the first region and the second region in the second image are not within confidence measurements, performing said locating step to locate the first region and the second region in the second image.

18. A method according to claim 3, further comprising the step of determining with the processor predicates that define a movement of the first object and the second object between the first image and the second image.

19. A method according to claim 3, wherein said steps (c) and (d) comprise the step of performing regression using a coarse-to-fine strategy.

20. A method according to claim 19, further comprising the steps of spatially filtering and subsampling the first image with the processor to form a Gaussian pyramid.

21. A method according to claim 19, wherein said step of performing regression is performed with robust regression analysis.

22. A method according to claim 19, wherein said step of performing robust regression analysis is given by minimizing the sum:

$$\sum_{x \in f} \rho(\nabla I(X(x)P_f + I_t, \sigma),$$

where:

$\rho$ is an error norm, $\sigma$ is a scale parameter, $\nabla I = [I_x, I_y]$, $I_t$ where the subscripts x and y, and t indicate partial derivatives of image brightness with respect to the spatial dimensions and time, $$X(x) = \begin{bmatrix} 1 & x & y & 0 & 0 & 0 & x^2 & xy & 0 \\ 0 & 0 & 0 & 1 & x & y & xy & y^2 & x^2 \end{bmatrix},$$

where u(x,y) and v(x,y) are the horizontal and vertical components of the flow at an image point x=(x,y), respectively, and $P_f$ is planar motion parameters of the set of image points in the first region of the first image.

23. A system according to claim 2, further comprising a region tracking system for updating location and shape information of the first region and the second region in the second image.

24. A system according to claim 2, further comprising a feature motion detector for determining predicates that define a movement of the first object and the second object between the first image and the second image.

25. A system according to claim 2, wherein the first transformation defines a translational movement between the first region in the first image and the first region in the second image.

26. A system according to claim 2, wherein the first transformation defines a rotational movement between the first region in the first image and the first region in the second image.

* * * * *